US010436927B2

(12) United States Patent
Sun et al.

(10) Patent No.: US 10,436,927 B2
(45) Date of Patent: Oct. 8, 2019

(54) SEISMIC WAVEFORM INVERSION

(71) Applicant: Schlumberger Technology Corporation, Sugar Land, TX (US)

(72) Inventors: Dong Sun, Katy, TX (US); Kun Jiao, Katy, TX (US); Xin Cheng, Katy, TX (US); Denes Vigh, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 54 days.

(21) Appl. No.: 15/561,948

(22) PCT Filed: Mar. 24, 2016

(86) PCT No.: PCT/US2016/023958
§ 371 (c)(1),
(2) Date: Sep. 26, 2017

(87) PCT Pub. No.: WO2016/154404
PCT Pub. Date: Sep. 29, 2016

(65) Prior Publication Data
US 2018/0120464 A1    May 3, 2018

Related U.S. Application Data
(60) Provisional application No. 62/138,750, filed on Mar. 26, 2015.

(51) Int. Cl.
*G01V 1/48* (2006.01)
*G01V 1/28* (2006.01)
*G01V 1/36* (2006.01)

(52) U.S. Cl.
CPC ............... *G01V 1/48* (2013.01); *G01V 1/282* (2013.01); *G01V 1/364* (2013.01); *G01V 2210/324* (2013.01)

(58) Field of Classification Search
CPC ... G01V 1/48; G01V 1/34; G01V 1/32; G01V 1/28; G01V 1/282; G01V 1/364; G01V 1/368; G01V 2210/324
See application file for complete search history.

(56) References Cited

U.S. PATENT DOCUMENTS

2007/0203673 A1   8/2007   Sherrill et al.
2011/0090760 A1   4/2011   Rickett et al.
(Continued)

OTHER PUBLICATIONS

Liu et al., Extended Reflection Waveform Inversion Via Differential Semblance Optimization, Oct. 26-31, 2014, SEG Denver 2014 Annual Meeting, pp. 1232-1237 (Year: 2014).*
(Continued)

*Primary Examiner* — Toan M Le
(74) *Attorney, Agent, or Firm* — Michael Guthrie

(57) ABSTRACT

A method can include receiving seismic data of a geologic environment; receiving a background model that is a part of a partitioned model of the geologic environment; predicting reflections using the background model; determining incoherence of an offset-dependent matching filter based at least in part on the reflections and the seismic data; based at least in part on the incoherence, adjusting the background model to generate an adjusted background model; and outputting the adjusted background model.

25 Claims, 13 Drawing Sheets

(56) References Cited

U.S. PATENT DOCUMENTS

| | | |
|---|---|---|
| 2011/0194379 A1 | 8/2011 | Lee et al. |
| 2011/0267921 A1 | 11/2011 | Mortel et al. |
| 2013/0028052 A1 | 1/2013 | Routh et al. |

OTHER PUBLICATIONS

Abstract of Liu et al. Reference, Oct. 26-31, 2014, 2 pp. (Year: 2014).*

International Preliminary Report on Patentability for the equivalent International patent application PCT/US2016/023958 dated Oct. 5, 2017.

Brossier, et al., "Velocity model building from seismic reflection data by full-waveform inversion," Geophysical Prospecting, 2015, vol. 63, Issue 2, pp. 354-367 (article first published online: Nov. 11, 2014).

Clement, et al., "Waveform inversion through MBTT formulation," Mathematical and Numerical Aspects of Wave Propagation, 1993, pp. 142-151.

Gauthier, et al., "Two-dimensional nonlinear inversion of seismic waveforms," Geophysics, vol. 51, No. 7, Jul. 1986, pp. 1387-1403.

Luo, et al., "Wave-equation traveltime inversion," Geophysics vol. 56, No. 5 May 1991, pp. 645-653.

Ma, et al., "Wave-equation reflection traveltime inversion with dynamic warping and full-waveform inversion," Geophysics, vol. 78, No. 6, Nov.-Dec. 2013, pp. R223-R233.

Mulder et al., "Automatic Velocity Analysis by Differential Semblance Optimization," SEG Technical Program Expanded Abstracts, SEG Int'l Exposition and Annual Meeting, San Antonio, Texas, Sep. 9-14, 2001, pp. 893-896.

Panning, et al., "Seismic waveform modelling in a 3-D Earth using the Born approximation: potential shortcomings and a remedy," Geophys. J. Int. 2009, 177, pp. 161-178.

Pratt, "Seismic waveform inversion in the frequency domain, part 1: Theory, and verification in a physical scale model," Geophysics, vol. 64, No. 3, May-Jun. 1999, pp. 888-901.

Sava, et al., "Wave-equation migration velocity analysis. I. Theory," Geophysical Prospecting, 2004, vol. 52, Issue 6, pp. 593-606.

Shen, et al., "Automatic velocity analysis via shot profile migration," Geophysics, vol. 73, No. 5, Sep.-Oct. 2008, pp. VE49-VE59.

Symes, "A Differential Semblance Algorithm for the Inverse Problem of Reflection Seismology," Computers and Mathematics with Applications, 1991, vol. 22, No. 4/5, pp. 147-178.

Tang, et al., "Tomographically enhanced full wavefield inversion," SEG Houston 2013 Annual Meeting, pp. 1037-1041.

Tarantola, "Inversion of seismic reflection data in the acoustic approximation," Geophysics, vol. 49, No. 8, Aug. 1984, pp. 1259-1266.

Vigh, et al., "3D plane-wave full-waveform inversion," Geophysics, 2008, vol. 73, No. 5, Sep.-Oct. 2008, pp. VE135-VE144.

Xu, et al., "Inversion on Reflected Seismic Wave," SEG Las Vegas 2012 Annual Meeting, pp. 1-7.

International Search Report and Written Opinion for the equivalent International patent application PCT/US2016/023958 dated Jun. 20, 2016.

Brossier et al., Combining diving and reflected waves for velocity and impedance models building by waveform inversion, Inverse Problem Meeting, Dec. 12, 2014 (58 pages).

Extended Search Report issued in the related EP application 16769667.3, dated Nov. 13, 2018 (7 pages).

Lailly, P., 1983, The seismic inverse problem as a sequence of before stack migrations: Conference on inverse scattering: Theory and application, SIAM, 206-220 (17 pages).

Office Action issued in the related EP application 167696673, dated Jul. 4, 2019 (8 pages).

* cited by examiner

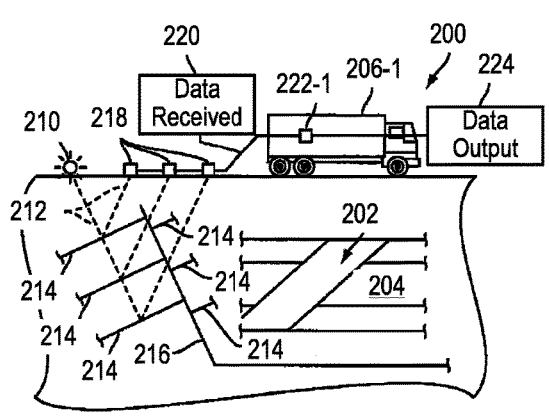
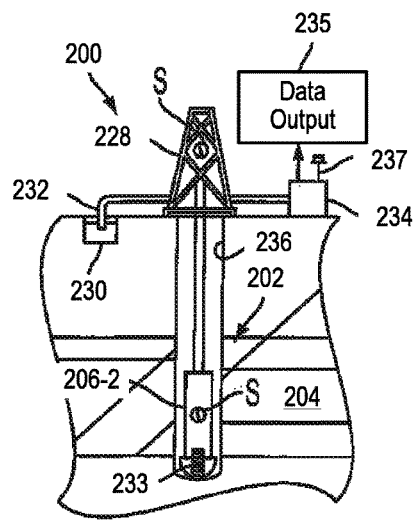
Fig. 2A   Fig. 2B
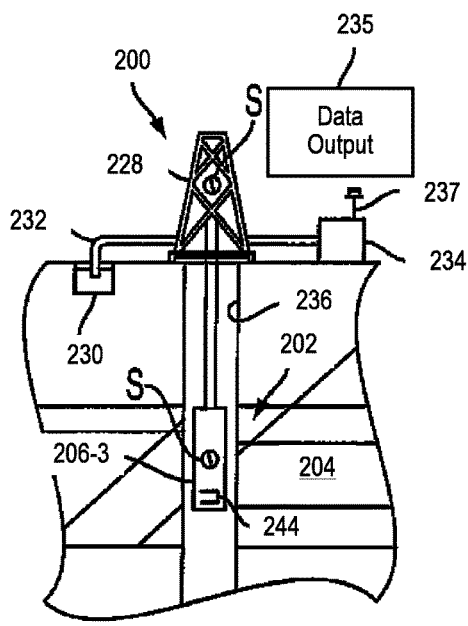
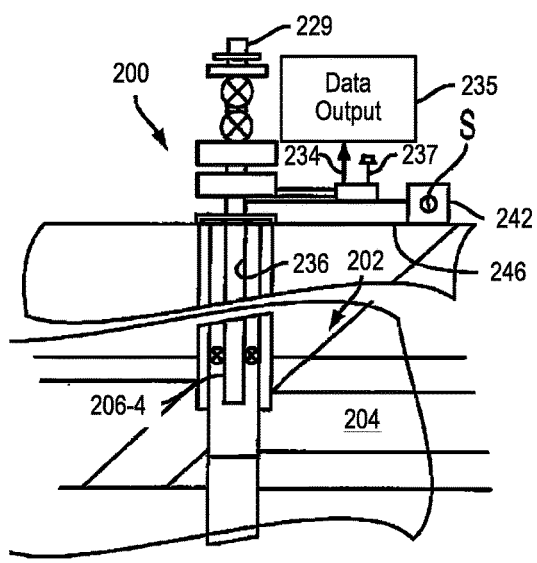
Fig. 2C   Fig. 2D

SEISMIC WAVEFORM INVERSION

RELATED APPLICATIONS

This application claims priority to and the benefit of a US Provisional Application having Ser. No. 62/138,750, filed 26 Mar. 2015, which is incorporated by reference herein.

BACKGROUND

Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks.

SUMMARY

A method can include receiving seismic data of a geologic environment; receiving a background model that is a part of a partitioned model of the geologic environment; predicting reflections using the background model; determining incoherence of an offset-dependent matching filter based at least in part on the reflections and the seismic data; based at least in part on the incoherence, adjusting the background model to generate an adjusted background model; and outputting the adjusted background model. A system can include a processor; memory accessible by the processor; and processor-executable instructions stored in the memory that include processor-executable instructions to instruct the system to receive seismic data of a geologic environment, receive a background model that is a part of a partitioned model of the geologic environment, predict reflections using the background model, determine incoherence of an offset-dependent matching filter based at least in part on the reflections and the seismic data, based at least in part on the incoherence, adjust the background model to generate an adjusted background model, and output the adjusted background model. One or more computer-readable storage media can include computer-executable instructions to instruct a system to: receive seismic data of a geologic environment; receive a background model that is a part of a partitioned model of the geologic environment; predict reflections using the background model; determine incoherence of an offset-dependent matching filter based at least in part on the reflections and the seismic data; based at least in part on the incoherence, adjust the background model to generate an adjusted background model; and output the adjusted background model.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIGS. 2A, 2B, 2C and 2D illustrate examples of equipment in geologic environments;

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than 1 Hz and/or optionally more than 100 Hz). Seismic data may be processed and interpreted, for example, to understand better composition, fluid content, extent and geometry of subsurface rocks.

Figure 1:
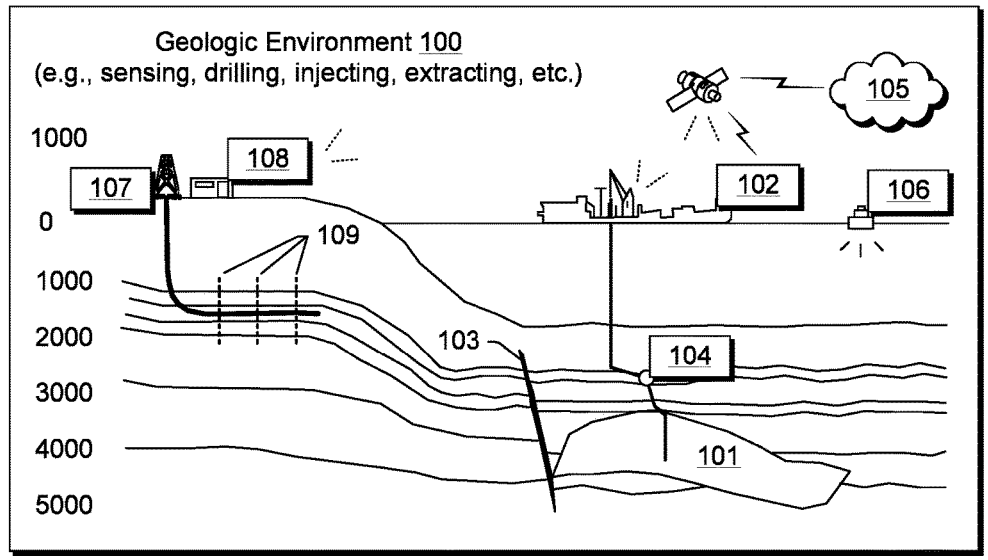
FIG. 1 illustrates an example of a geologic environment and an example of a technique.
Figure 1:
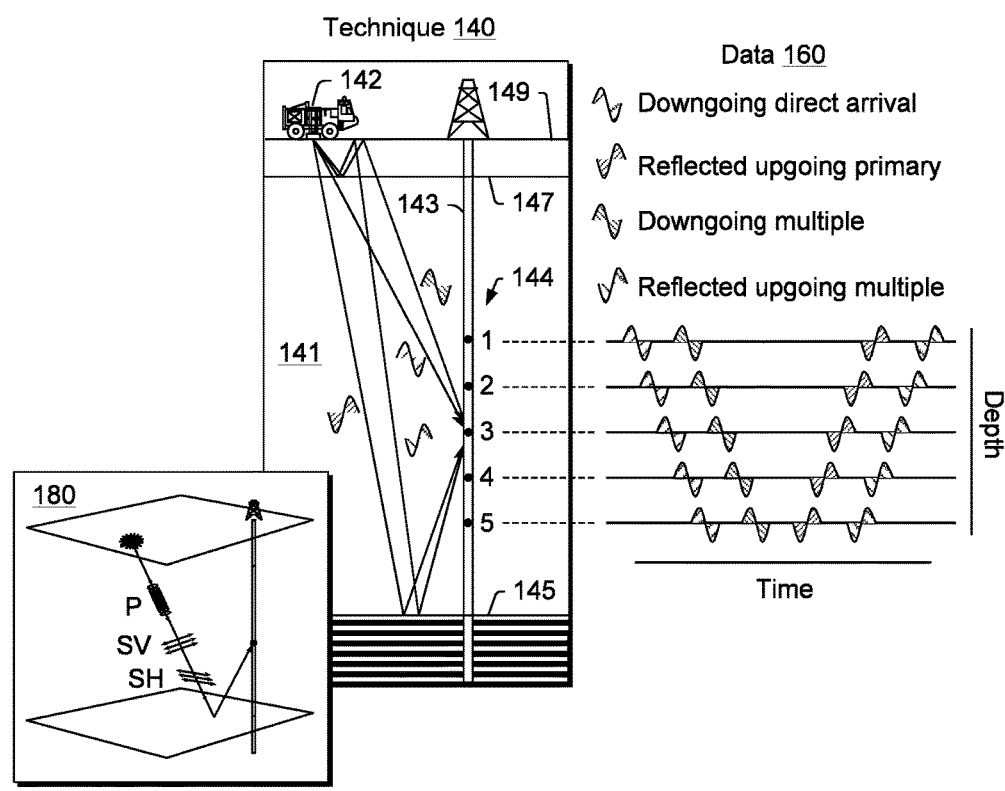

FIG. 1 shows an example of a geologic environment 100 (e.g., an environment that includes a sedimentary basin, a reservoir 101, a fault 103, one or more fractures 109, etc.) and an example of an acquisition technique 140 to acquire seismic data (see, e.g., data 160). As an example, a system may process data acquired by the technique 140, for example, to allow for direct or indirect management of sensing, drilling, injecting, extracting, etc., with respect to the geologic environment 100. In turn, further information about the geologic environment 100 may become available as feedback (e.g., optionally as input to the system). As an example, an operation may pertain to a reservoir that exists in the geologic environment 100 such as, for example, the reservoir 101. As an example, a technique may provide information (e.g., as an output) that may specifies one or more location coordinate of a feature in a geologic environment, one or more characteristics of a feature in a geologic environment, etc.

As an example, the geologic environment 100 may be referred to as or include one or more formations. As an example, a formation may be a unit of lithostratigraphy, for example, a body of rock that is sufficiently distinctive and continuous that it can be mapped. As an example, in stratigraphy, a formation may be a body of strata of predominantly one type or combination of types, for example, where multiple formations form groups, and subdivisions of formations are members.

As an example, a sedimentary basin may be a depression in the crust of the Earth, for example, formed by plate tectonic activity in which sediments accumulate. Over a period of geologic time, continued deposition may cause further depression or subsidence. With respect to a petroleum systems analysis, if rich hydrocarbon source rocks occur in combination with appropriate depth and duration of burial, hydrocarbon generation may possibly occur within a basin. Exploration plays and prospects may be developed in basins or regions in which a complete petroleum system has some likelihood of existing. The geologic environment 100 of FIG. 1 may include one or more plays, prospects, etc.

As an example, a system may be implemented to process seismic data, optionally in combination with other data. In such an example, the seismic data can be acquired using acquisition equipment (e.g., sources and receivers) disposed in a field (e.g., an oilfield, etc.). Processing of data may include generating one or more seismic attributes, rendering information to a display or displays, etc. A process or workflow may include interpretation, which may be performed by an operator that examines renderings of information and that identifies structure or other features within such renderings. Interpretation may be or include analyses of data with a goal to generate one or more models and/or predictions (e.g., about properties and/or structures of a subsurface region).

As an example, a system may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment, decision making, operational control, etc.).

As an example, a system may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components (e.g., modules, blocks, etc.) may be implemented as add-ons (or plug-ins) that conform to and operate according to specifications of a framework environment (e.g., according to application programming interface (API) specifications, etc.).

As an example, seismic data may be processed using a framework such as the OMEGA® framework (Schlumberger Limited, Houston, Tex.). The OMEGA® framework provides features that can be implemented for processing of seismic data, for example, through prestack seismic interpretation and seismic inversion. A framework may be scalable such that it enables processing and imaging on a single workstation, on a massive compute cluster, etc. As an example, one or more techniques, technologies, etc. described herein may optionally be implemented in conjunction with a framework such as, for example, the OMEGA® framework.

As an example, the OMEGA® framework can extend geophysics data processing into reservoir modeling, for example, via operatively coupling with the PETREL® framework. As an example, Earth Model Building (EMB) tools of the PETREL® framework can facilitate one or more depth imaging workflows, which may include model building, editing and updating, depth-tomography QC, residual moveout analysis, volumetric common-image-point (CIP) pick QC, etc. Such features may be utilized in conjunction with the OMEGA® framework's depth tomography and migration algorithms, for example, to produce images of one or more subsurface regions.

As an example, one or more workflows may be performed using the PETREL® framework and the OMEGA® framework. For example, the OMEGA® framework may be utilized to perform inversion where results therefrom may be utilized in the PETREL® framework for populating a three-dimensional space with objects that represent physical features of the three-dimensional space. For example, a horizon object may represent a horizon, a surface object may represent a surface, a geobody object may represent a geobody, etc. As an example, seismic data may be processed to identify features in a geologic environment where such features may then be represented in a model of the geologic environment. In such an example, the model may be an object-based model of an object-based framework (e.g., consider an object-based framework that can utilize .NET® framework tools, etc.). As an example, a framework can include representing features in a three-dimensional space via objects where representations thereof may be rendered to a display (e.g., as part of a graphical user interface, etc.).

A framework for processing data may include features for handling data from 2D line and 3D seismic surveys. Such a framework can include features for prestack seismic interpretation (PSI), optionally pluggable into a framework such as the OCEAN® framework. As an example, a workflow may be specified to include processing via one or more frameworks, plug-ins, add-ons, etc. As an example, a workflow may include quantitative interpretation, which may include performing pre- and poststack seismic data conditioning, inversion (e.g., seismic to properties and properties to synthetic seismic), wedge modeling for thin-bed analysis, amplitude versus offset (AVO) and amplitude versus angle (AVA) analysis, reconnaissance, etc. As an example, a workflow may aim to output rock properties based at least in part on processing of seismic data. As an example, various types of data may be processed to provide one or more models (e.g., earth models). For example, consider processing of one or more of seismic data, well data, electromagnetic and magnetic telluric data, reservoir data, etc.

As an example, a method can include acquiring seismic data via one or more types of seismic surveys. As an example, a seismic survey can acquire long-offset, wide-bandwidth, wide-azimuth and/or wide-aperture seismic data.

As an example, a seismic survey may aim to acquire fully recorded seismic wavefields. As an example.

In the example of FIG. 1, the geologic environment 100 includes an offshore portion and an on-shore portion. One or more seismic surveys may include information (e.g., seismic data) for one or more offshore portions and/or one or more on-shore portions. As an example, a geologic environment may be or include one or more of an offshore geologic environment, a seabed geologic environment, an ocean bed geologic environment, etc.

As an example, the geologic environment 100 may be outfitted with any of a variety of sensors, detectors, actuators, etc. For example, equipment 102 may include communication circuitry to receive and to transmit information with respect to one or more networks 105. Such information may include information associated with downhole equipment 104, which may be equipment to acquire information, to assist with resource recovery, etc. Other equipment 106 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 105 that may be configured for communications, noting that the satellite may additionally or alternatively include circuitry for imagery (e.g., spatial, spectral, temporal, radiometric, etc.).

FIG. 1 also shows the geologic environment 100 as optionally including equipment 107 and 108 associated with a well that includes a substantially horizontal portion that may intersect with one or more of the one or more fractures 109. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 107 and/or 108 may include components, a system, systems, etc. for fracturing, seismic sensing, analysis of seismic data, assessment of one or more fractures, etc.

As an example, a system may be used to perform one or more workflows. A workflow may be a process that includes a number of worksteps. A workstep may operate on data, for example, to create new data, to update existing data, etc. As an example, a system may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the OMEGA® framework. As an example, a workflow may be a workflow implementable at least in part in the PETREL® framework, for example, that operates on seismic data, seismic attribute(s), etc. As an example, a workflow may be a process implementable at least in part in the OCEAN® framework. As an example, a workflow may include one or more worksteps that access a module such as a plug-in (e.g., external executable code, etc.). As an example, a workflow may include rendering information to a display (e.g., a display device). As an example, a workflow may include receiving instructions to interact with rendered information, for example, to process information and optionally render processed information. As an example, a workflow may include transmitting information that may control, adjust, initiate, etc. one or more operations of equipment associated with a geologic environment (e.g., in the environment, above the environment, etc.).

In FIG. 1, the technique 140 may be implemented with respect to a geologic environment 141, which may be a portion of the geologic environment 100. As shown in the example of FIG. 1, an energy source (e.g., a transmitter) 142 may emit energy where the energy travels as waves that interact with the geologic environment 141. As an example, the geologic environment 141 may include a bore 143 where one or more sensors (e.g., receivers) 144 may be positioned in the bore 143; noting that one or more surface and/or other sensors (e.g., receivers) may be utilized. As an example, energy emitted by the energy source 142 may interact with a layer (e.g., a structure, an interface, etc.) 145 in the geologic environment 141 such that a portion of the energy is reflected (e.g., by one or more physical structures in the geologic environment 141), which may then be sensed by one or more of the sensors 144. Such energy may be reflected as an upgoing primary wave (e.g., or "primary" or "singly" reflected wave). As an example, a portion of emitted energy may be reflected by more than one structure in the geologic environment and referred to as a multiple reflected wave (e.g., or "multiple"). For example, the geologic environment 141 is shown as including a layer 147 that resides below a surface layer 149. Given such an environment and arrangement of the source 142 and the one or more sensors 144, energy may be sensed as being associated with particular types of waves.

As an example, a "multiple" may refer to multiply reflected seismic energy or, for example, an event in seismic data that has incurred more than one reflection in its travel path. As an example, depending on a time delay from a primary event with which a multiple may be associated, a multiple may be characterized as a short-path or a peg-leg, for example, which may imply that a multiple may interfere with a primary reflection, or long-path, for example, where a multiple may appear as a separate event. As an example, seismic data may include evidence of an interbed multiple from bed interfaces, evidence of a multiple from a water interface (e.g., an interface of a base of water and rock or sediment beneath it) or evidence of a multiple from an air-water interface, etc.

As shown in FIG. 1, the acquired data 160 can include data associated with downgoing direct arrival waves, reflected upgoing primary waves, downgoing multiple reflected waves and reflected upgoing multiple reflected waves. The acquired data 160 is also shown along a time axis and a depth axis. As indicated, in a manner dependent at least in part on characteristics of media in the geologic environment 141, waves travel at velocities over distances such that relationships may exist between time and space. Thus, time information, as associated with sensed energy, may allow for understanding spatial relations of layers, interfaces, structures, etc. in a geologic environment.

FIG. 1 also shows various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that may characterize anisotropy of media (e.g., seismic anisotropy), consider the Thomsen parameters $\varepsilon$, $\delta$ and $\gamma$. The Thomsen parameter $\delta$ describes depth mismatch between logs (e.g., actual depth) and seismic depth. As to the Thomsen parameter $\varepsilon$, it describes a difference between vertical and horizontal compressional waves (e.g., P or P-wave or quasi compressional wave qP or qP-wave). As to the Thomsen parameter $\gamma$, it describes a difference between horizontally polarized and vertically polarized shear waves (e.g., horizontal shear wave SH or SH-wave and vertical shear wave SV or SV-wave or quasi vertical shear wave qSV or qSV-wave). Thus, the Thomsen parameters $\varepsilon$ and $\gamma$ may be estimated from wave data while estimation of the Thomsen parameter $\delta$ may involve access to additional information.

As an example, seismic data may be acquired for a region in the form of traces. In the example of FIG. 1, the technique 140 may include the source 142 for emitting energy where portions of such energy (e.g., directly and/or reflected) may be received via the one or more sensors 144. As an example, energy received may be discretized by an analog-to-digital converter that operates at a sampling rate. For example, acquisition equipment may convert energy signals sensed by a sensor to digital samples at a rate of one sample per approximately 4 ms. Given a speed of sound in a medium or media, a sample rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

FIGS. 2A, 2B, 2C and 2D illustrate approximate schematic views of a geologic environment 200 that includes a subterranean formation 202 that includes a reservoir 204. FIG. 2A shows an example of a survey operation being performed by a survey tool, such as seismic truck 206-1 that can measure properties of the subterranean formation 202. Such a survey operation can be a seismic survey operation for producing sound vibrations.

In the example of FIG. 2A, a sound vibration 212 is illustrated as being generated by a source 210 where energy reflects off horizons 214 in a portion of the geologic environment 200, particularly a formation 216. As shown, a set of sound vibrations can be received by sensors 218 (e.g., geophones). Data received 220 can be provided as input data to a computer 222-1 of the seismic truck 206-1, and responsive to the input data, the computer 222-1 can generates seismic data output 224. Such seismic data output may be stored, transmitted or further processed as desired, for example, by data reduction.

In the example of FIG. 2B, a drilling operation is shown as being performed by drilling tools 206-2 suspended by rig 228 and advanced into a subterranean formation 202 to form a wellbore 236. As shown, a mud pit 230 can be used to draw drilling mud into the drilling tools 206-2 via a flow line 232 for circulating drilling mud down through the drilling tools 206-2, then up the wellbore 236 and back to the surface. The drilling mud can be filtered and returned to the mud pit. A circulating system may be used for storing, controlling, or filtering the flowing drilling mud. The drilling tools 206-2 can be advanced into the subterranean formation 202 to reach a reservoir 204. As an example, individual wells may target one or more reservoirs. The drilling tools 206-2 can be adapted for measuring downhole properties using logging while drilling (LWD) tools. As an example, one or more logging while drilling (LWD) tools may include features for taking a core sample 233.

In the example of FIG. 2B, computer facilities may be positioned at various locations about the geologic environment 200 (see, e.g., a surface unit 234) and/or at one or more remote locations. In the example of FIG. 2B, the surface unit 234 may be used to communicate with one or more of the drilling tools 206-2 and/or offsite operations, as well as with other surface or downhole sensors. Surface unit 234 can include features for communicating with one or more of the drilling tools 206-2 to send commands thereto and/or to receive data therefrom. The surface unit 234 may collect data generated during the drilling operation and produce data output 235, which may then be stored or transmitted.

In the example of FIG. 2B, sensors (S), such as gauges, may be positioned about the geologic environment 200 to collect data relating to various oilfield operations as described previously. As shown, one or more sensors (S) are positioned in one or more locations in the drilling tools 206-2 and/or at the rig 228 to measure drilling parameters, such as weight on bit, torque on bit, pressures, temperatures, flow rates, compositions, rotary speed, and/or other parameters of the field operation. Sensors (S) may be positioned in one or more locations in the circulating system.

As an example, the drilling tools 206-2 may include a bottom hole assembly (BHA), for example, near a drill bit (e.g., within several drill collar lengths from a drill bit). A bottom hole assembly (BHA) can include capabilities for measuring, processing, and storing information, as well as communicating with the surface unit 234. A BHA can include drill collars for performing various other measurement functions.

As an example, a BHA may include a communication subassembly that communicates with the surface unit 234. For example, consider a communication subassembly that can send signals to and receive signals from the surface using a communications channel such as mud pulse telemetry, electro-magnetic telemetry, or wired drill pipe communications. Such a communication subassembly may include, for example, a transmitter that generates a signal, such as an acoustic or electromagnetic signal, which is representative of the measured drilling parameters.

As an example, a wellbore can be drilled according to a drilling plan that is established prior to drilling. A drilling plan can set forth equipment, pressures, trajectories and/or other parameters that define the drilling process for the wellsite. As an example, a drilling operation may be performed according to a drilling plan; noting that, as information is gathered, the drilling operation may deviate from the drilling plan. As an example, as drilling or other operations are performed, the subsurface conditions may change. For example, an earth model may be adjusted as new information is collected.

The data gathered by one or more sensors (S) may be collected by the surface unit 234 and/or other data collection sources for analysis or other processing. As an example, data collected by sensors (S) may be used alone or in combination with other data. As an example, data may be collected in one or more databases and/or transmitted on or offsite. As an example, data may be historical data, real time data, or combinations thereof. As an example, real time data may be used in real time, or stored for later use. As an example, data may be combined with historical data or other inputs for further analysis. As an example, data may be stored in separate databases, or combined into a single database.

In the example of FIG. 2B, the surface unit 234 may include a transceiver 237 that provides for communications between the surface unit 234 and various portions of the geologic environment 200 and/or one or more other locations. The surface unit 234 may include features to connect to one or more controllers, for example, to actuate mechanisms of equipment at the geologic environment 200. As an example, the surface unit 234 may transmit command signals to one or more pieces of equipment in response to data received. As an example, the surface unit 234 may receive commands via the transceiver 237 or, for example, it may execute commands to a controller.

As an example, one or more processors can be included locally and/or remotely as part of computing equipment that includes memory accessible by at least one of the one or more processors. Such memory can be, for example, one or more computer-readable storage media that can store processor-executable instructions. In such an example, a computer-readable storage medium can be a physical storage device that is non-transitory and not a carrier wave or a signal. As an example, computing equipment can include one or more interfaces that can receive and/or transmit information. As an example, information can include one or more control signals, for example, to control one or more pieces of equipment.

In the example of FIG. 2B, operations may be selectively adjusted based at least in part on data collected. As an example, computing equipment may be utilized to control one or more field operations such as, for example, controlling drilling, weight on bit, pump rates, and/or one or more other operational parameters. As an example, one or more adjustments may be made automatically based on computer protocol, and/or manually by an operator.

In the example of FIG. 2C, a wireline operation being performed by a wireline tool 206-3 being suspended by a rig 228 in a wellbore 236. As shown, the wireline tool 206-3 can be adapted for deployment into the wellbore 236 for generating well logs, performing downhole tests and/or collecting samples. As an example, a wireline tool 206c may include equipment for performing at least a portion of a seismic survey operation. As an example, a wireline tool may, for example, include an explosive, radioactive, electrical, and/or acoustic energy source 244 that can send signals to surrounding a subterranean formation 202 and fluids therein.

As an example, the wireline tool 206-3 may be operatively connected to, for example, geophones 218 and the computer 222-1 of the seismic truck 206-1 of FIG. 2A. As an example, the wireline tool 206-3 may provide data to the surface unit 234. As an example, the surface unit 234 may collect data generated during the wireline operation and may produce data output 235 that may be stored and/or transmitted. As an example, the wireline tool 206-3 may be positioned at various depths in the wellbore 236 to provide a survey and/or other information relating to the subterranean formation 202.

As an example, one or more sensors (S), such as gauges, may be positioned to collect data relating to various field operations. As shown in FIG. 2C, a sensor (S) can be positioned in the wireline tool 206-3 to measure downhole parameters which relate to, for example, one or more of porosity, permeability, fluid composition and/or other parameters of the field operation.

In the example of FIG. 2D, a production operation being performed by production tool 206-4 deployed from a production unit or Christmas tree 229 and into a completed wellbore 236 for drawing fluid from one or more downhole reservoirs into surface facilities 242. The fluid can flow from a reservoir 204 through perforations in the casing and into the production tool 206-4 in the wellbore 236 and to surface facilities 242 via a gathering network 246.

As an example, one or more sensors (S), such as gauges, may be positioned to collect data relating to various field operations. As shown, a sensor (S) may be positioned in the production tool 206-4 or associated equipment such as, for example, the Christmas tree 229, the gathering network 246, the surface facility 242, and/or the production facility, for example, to measure fluid parameters such as, for example, fluid composition, flow rates, pressures, temperatures, and/or one or more other parameters of the production operation.

As an example, production operation can include use of one or more injection wells. As an example, one or more gathering facilities may be operatively connected to one or more wellsites for selectively collecting downhole fluids from the wellsite(s).

As an example, various tools may be used in connection with non-oilfield operations, such as gas fields, mines, aquifers, storage or other subterranean facilities. As an example, various measurement tools capable of sensing parameters, such as seismic two-way travel time, density, resistivity, production rate, etc., of the subterranean formation and/or its geological formations may be used. As an example, various sensors (S) may be located at various positions along a wellbore to collect data and/or monitor one or more conditions. As an example, one or more sources of data may be provided from one or more offsite locations.

Figure 3:
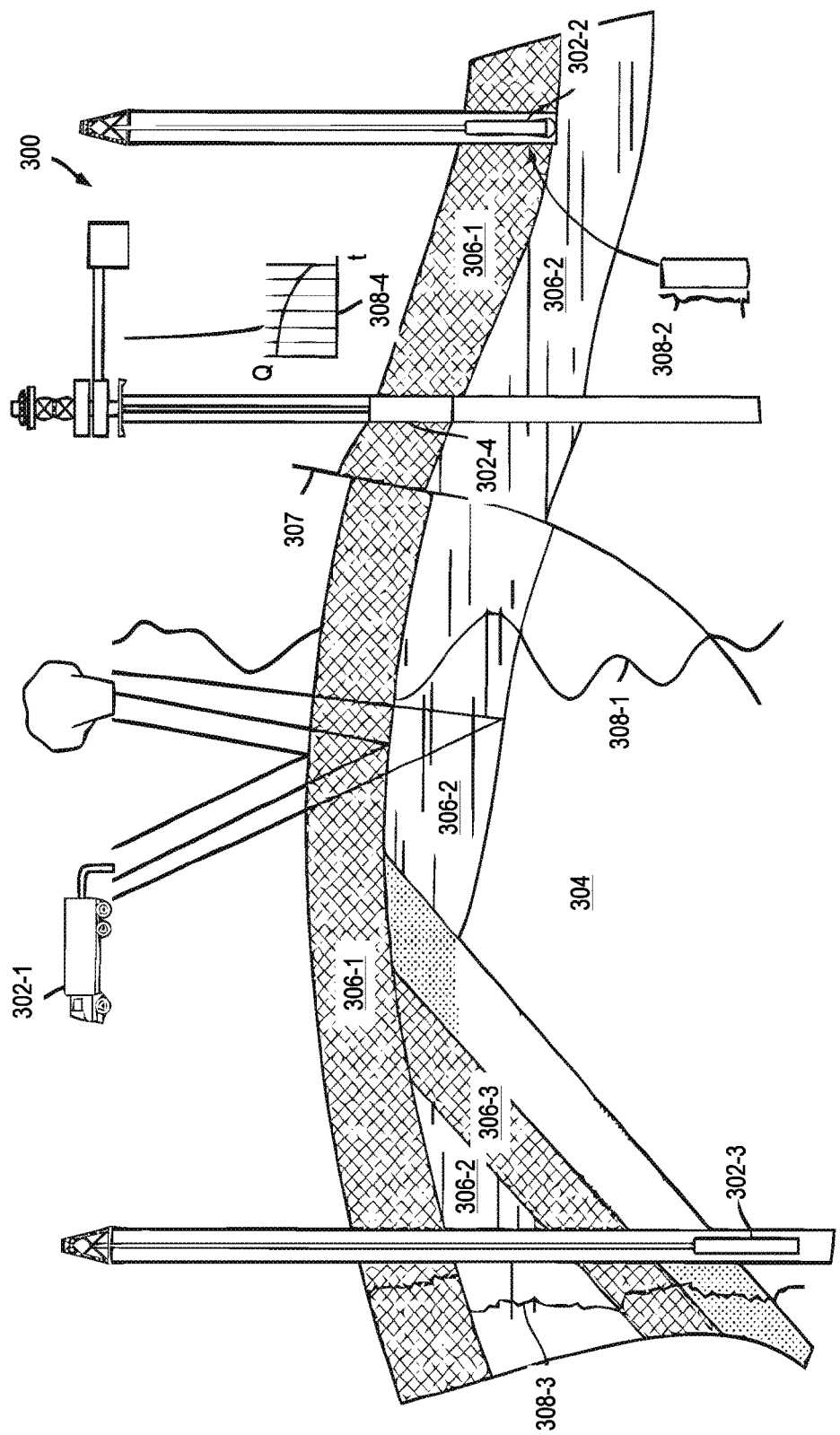
FIG. 3 illustrates examples of equipment in a geologic environment.

FIG. 3 shows an example of a schematic view, partially in cross section of a geologic environment 300 where data acquisition tools 302-1, 302-2, 302-3 and 302-4 are positioned for collecting data of a subterranean formation 304. As an example, the data acquisition tools 302-1, 302-2, 302-3 and 302-4 can correspond to tools such as those of FIGS. 2A to 2D (e.g., 206-1, 206-2, 206-3 and 206-4). As an example, one or more data acquisition tools can acquire data (e.g., plots, measurements, etc.).

In the example of FIG. 3, various examples of data plots 308-1, 308-2 and 308-3 are shown, which may be data plots (e.g., data measurements, etc.) generated by corresponding data acquisition tools 302-1, 302-2 and 302-3, respectively. Such information may be analyzed to aid in defining one or more properties, etc.

In the example of FIG. 3, the data plot 308-1 can be a seismic two-way response over a period of time; the data plot 308-2 can be core sample data measured from a core sample of a formation (e.g., used to provide data, such as a graph of the density, porosity, permeability, or some other physical property of the core sample over the length of the core). As an example, one or more tests for density and/or viscosity may be performed on fluids in a core at varying pressures and/or temperatures. As an example, the data plot 308-3 can be a logging trace that provides a resistivity or other measurement of a formation at various depths.

In the example of FIG. 3, a production decline curve or graph 308-4 can be a data plot of fluid flow rate over time. As an example, a production decline curve can provide production rate at various times. For example, as fluid flows through a wellbore, measurements can be taken for fluid properties such as, for example, one or more of flow rate, pressures, composition, etc.

As an example, the subterranean structure 304 of FIG. 3 can include a plurality of geological formations 306-1, 306-2, 306-3 and 306-4. As an example, consider one or more of the following types of layers, a shale layer 306-1, a carbonate layer 306-2, a shale layer 306-3 and a sand layer 306-4. As an example, a fault 307 can extend through the shale layer 306-1 and the carbonate layer 306-2.

In the example of FIG. 3, seismic data displayed in the data plot 308-1 from the data acquisition tool 302-1 can be used by a geophysicist to determine characteristics of the subterranean formations and features; core data shown in data plot 308-2 and/or log data from a well log of the data plot 308-3 may be used by a geologist to determine various characteristics of the subterranean formation; and/or production data from the plot 308-4 can be used by the reservoir engineer to determine fluid flow reservoir characteristics. As an example, data analyzed by a geologist, a geophysicist and a reservoir engineer may be analyzed using one or more modeling techniques where output therefrom may be utilized in planning and/or performing one or more field operations.

Figure 4:
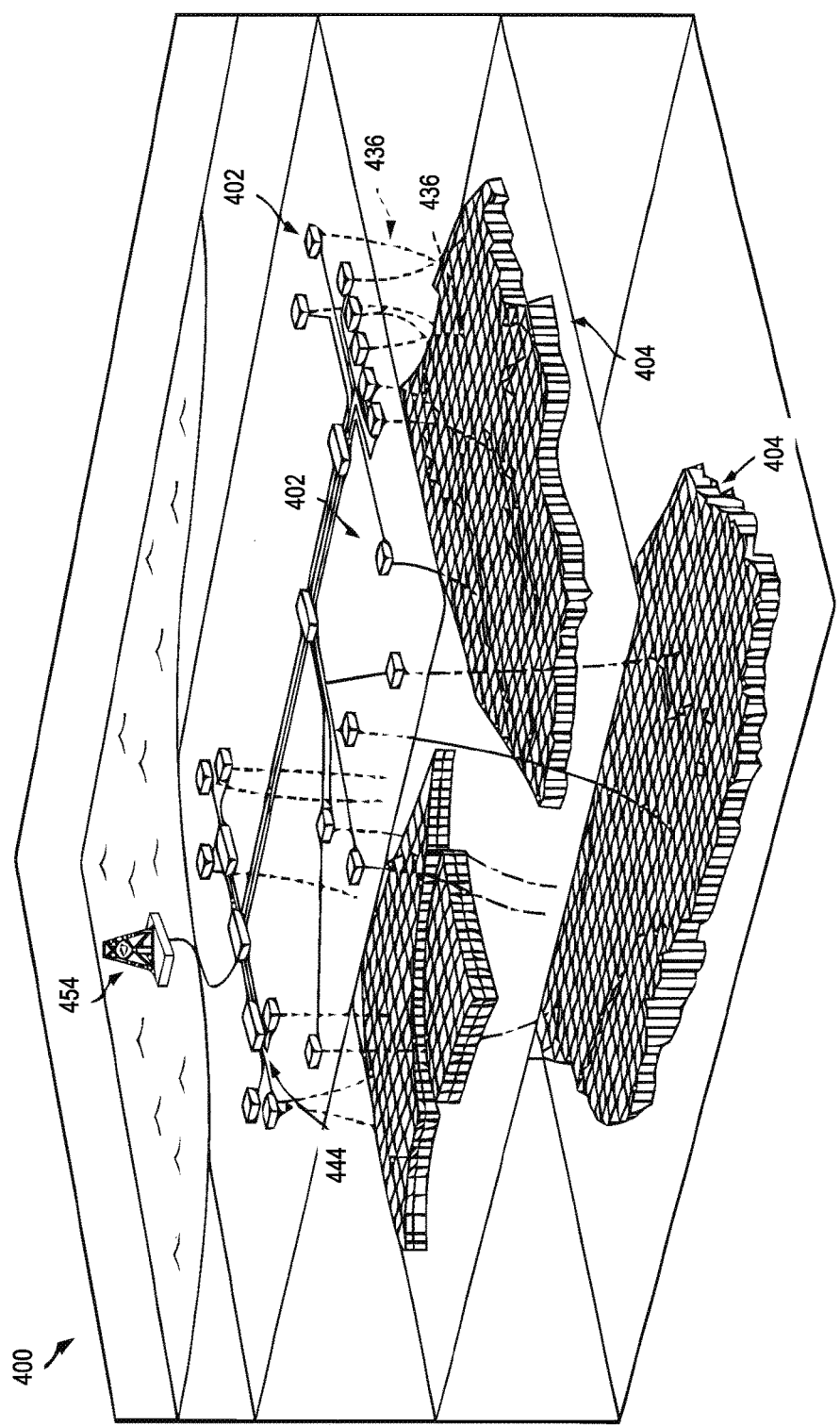
FIG. 4 illustrates examples of equipment in a geologic environment.

FIG. 4 shows an example of a geologic environment 400. As shown, the geologic environment 400 includes a plurality of wellsites 402 operatively connected to a processing facility 454. In the example of FIG. 4, individual wellsites 402 can include equipment that can form individual wellbores 436. Such wellbores can extend through subterranean formations 406 including one or more reservoirs 404. Such reservoirs 404 can include fluids, such as hydrocarbons. As an example, wellsites can draw fluid from one or more reservoirs and pass them to one or more processing facilities via one or more surface networks 444. As an example, a surface network can include tubing and control mechanisms for controlling flow of fluids from a wellsite to a processing facility.

Figure 5:
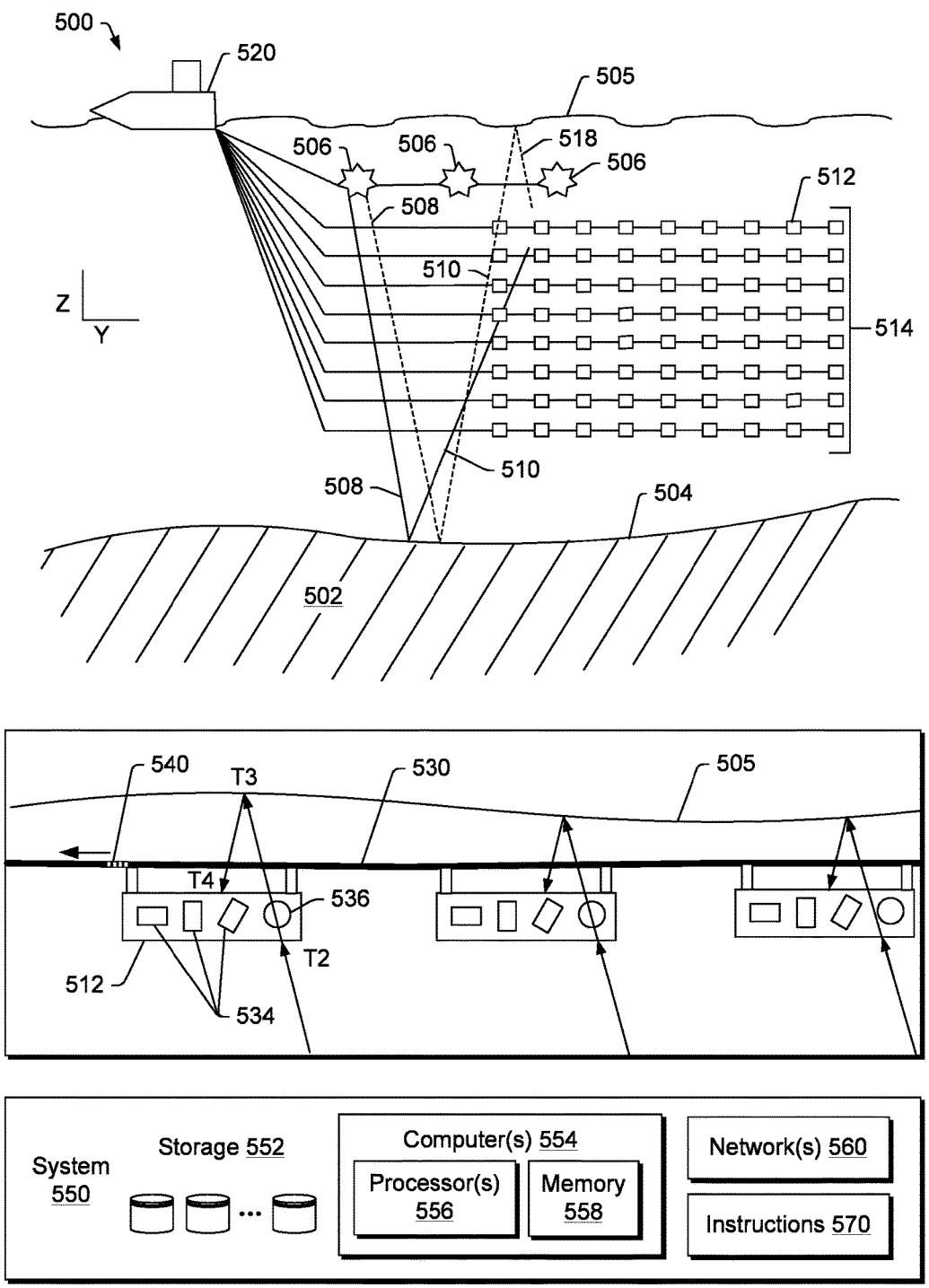
FIG. 5 illustrates an example of an offshore survey and examples of equipment.

FIG. 5 shows an example of an approximate side view of a marine-based survey 500 of a subterranean subsurface 502. The subsurface 502 includes a seafloor surface 504. Seismic sources 506 may include marine sources such as vibroseis or air guns, which may propagate seismic waves 508 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., about 5 Hz) and increase the seismic wave to a higher frequency (e.g., about 80 Hz to about 90 Hz or more) over time.

The component(s) of the seismic waves 508 may be reflected and converted by the seafloor surface 508 (e.g., as a reflector), and seismic wave reflections 510 may be received by a plurality of seismic receivers 512. As an example, seismic waves may penetrate the subsurface 502 below the seafloor surface 504 and be reflected by one or more reflectors therein and received by one or more of the plurality of seismic receivers 512. As shown in the example of FIG. 5, the seismic receivers 512 may be disposed on a plurality of streamers (e.g., a streamer array 514). The seismic receivers 512 may generate electrical signals representative of the received seismic wave reflections 370. The electrical signals may be embedded with information regarding the subsurface 502 and captured as a record of seismic data.

In one implementation, each streamer may include streamer steering devices such as a bird, a deflector, a tail buoy and the like. One or more streamer steering devices may be used to control streamer position.

In one implementation, the seismic wave reflections 510 may travel upward and reach the water/air interface at the water surface 505, a portion of reflections 510 may then reflect downward again (e.g., sea-surface ghost waves 518) and be received by the plurality of seismic receivers 512. As an example, the sea-surface ghost waves 518 may be referred to as surface multiples. In such an example, the point on the water surface 516 at which the wave is reflected downward may be referred to as a downward reflection point.

Electrical signals generated by one or more of the receivers 512 may be transmitted to a vessel 520 via transmission cables, wireless communication or the like. The vessel 520 may then transmit the electrical signals to a data processing center. Alternatively, the vessel 520 may include an onboard computing system capable of processing the electrical signals (e.g., representing seismic data). As an example, surveys may be of formations deep beneath the surface. The formations may include multiple reflectors, some of which may include dipping events, and may generate multiple reflections (including wave conversion) for receipt by the seismic receivers 512. As an example, seismic data may be processed to generate a seismic image of the subsurface.

As an example, a marine seismic acquisition system may tow streamers in the streamer array 514 at an approximate even depth (e.g., about 5 m to about 10 m). However, the marine based survey 500 may tow each streamer in streamer array 514 at different depths such that seismic data may be acquired and processed in a manner that avoids the effects of destructive interference due to sea-surface ghost waves. For instance, the marine-based survey 500 of FIG. 5 illustrates eight streamers towed by the vessel 520 at eight different depths. The depth of each streamer may be controlled and maintained using the birds disposed on each streamer.

As an example, each of the seismic receivers 512 (e.g., sensors) may include at least one geophone 534 and a hydrophone 536. As an example, a geophone may be a sensor configured for seismic acquisition, whether onshore and/or offshore, that can detect velocity produced by seismic waves and that can, for example, transform motion into electrical impulses. As an example, a geophone may be configured to detect motion in a single direction. As an example, a geophone may be configured to detect motion in a vertical direction. As an example, three mutually orthogonal geophones may be used in combination to collect so-called 3C seismic data. As an example, a hydrophone may be a sensor configured for use in detecting seismic energy in the form of pressure changes under water during marine seismic acquisition. As an example, hydrophones may be positioned along a string or strings to form a streamer or streamers that may be towed by a seismic vessel (e.g., or deployed in a bore). Thus, in the example of FIG. 5, the at least one geophone 534 can provide for motion detection and the hydrophone 536 can provide for pressure detection. As an example, data 540 (e.g., analog and/or digital) may be transmitted via equipment, for example, for processing, etc. For example, in FIG. 5, a cable 530 can include transmission wire, fiber, etc. for transmission of the data 540.

As an example, a method may include analysis of hydrophone response and vertical geophone response, which may help to improve a PZ summation, for example, by reducing receiver ghost and/or free surface-multiple noise contamination (see, e.g., PZSUM algorithm, discussed further below). As an example, a ghost may be defined as a reflection of a wavefield as reflected from a water surface (e.g., water and air interface) that is located above a receiver, a source, etc. (e.g., a receiver ghost, a source ghost, etc.). As an example, a receiver may experience a delay between an upgoing wavefield and its downgoing ghost, which may depend on depth of the receiver.

As an example, a surface marine cable may be or include a buoyant assembly of electrical wires that connect sensors and that can relay seismic data to the recording seismic vessel. As an example, a multi-streamer vessel may tow more than one streamer cable to increase the amount of data acquired in one pass. As an example, a marine seismic vessel may be about 75 m long and travel about 5 knots, for example, while towing arrays of air guns and streamers containing sensors, which may be located, for example, about a few meters below the surface of the water. A so-called tail buoy may assist crew in location an end of a streamer. As an example, an air gun may be activated periodically, such as about each 25 m (e.g., about at 10 second intervals) where the resulting sound wave travels into the Earth, which may be reflected back by one or more rock layers to sensors on a streamer, which may then be relayed as signals (e.g., data, information, etc.) to equipment on the tow vessel.

In the example of FIG. 5, the vessel 520 can include equipment, which may include a system such as the system 550. As shown in FIG. 5, the system 550 includes one or more information storage devices 552, one or more computers 254, one or more network interfaces 560 and instructions 570 (e.g., one or more modules of instructions, etc.). As to the one or more computers 554, each computer may include one or more processors (e.g., or processing cores) 556 and memory 558 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, a system may include one or more display devices (e.g., optionally as part of a computing device, etc.).

As an example, a hydrophone may sense pressure information (e.g., P data) and a geophone may sense velocity information (e.g., V and/or Z data). As an example, hydrophone may output signals, optionally as digital data, for example, for receipt by a system. As an example, a geophone may output signals, optionally as digital data, for example, for receipt by a system. As an example, the system 550 may receive P and V/Z data via one or more of the one or more network interfaces 560 and process such data, for example, via execution of instructions 570 stored in the memory 558 by the processor 556. As an example, the system 550 may store raw and/or processed data in one or more of the one or more information storage devices 552.

Figure 6:
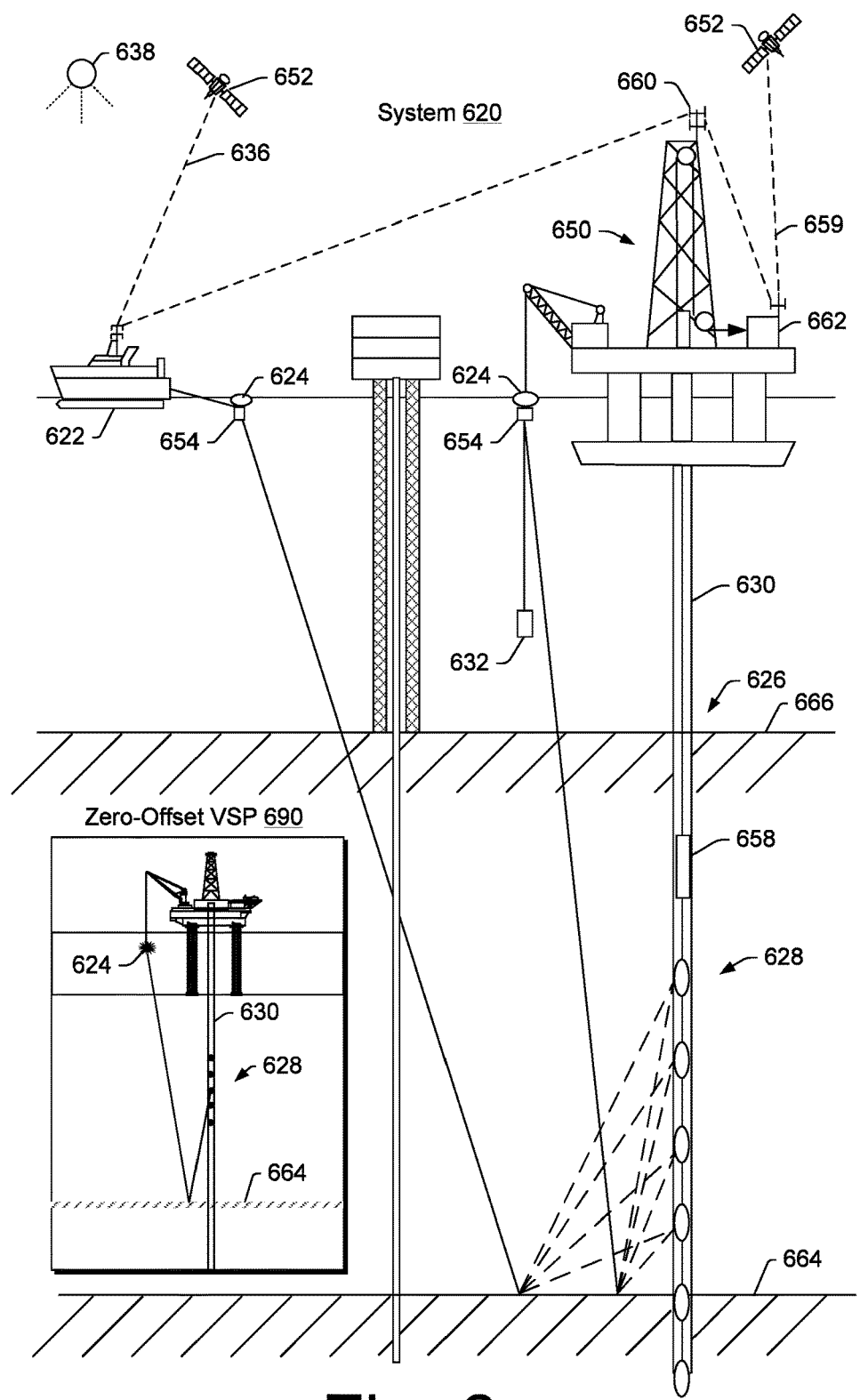
FIG. 6 illustrates examples of equipment and examples of survey techniques.

FIG. 6 shows an example of a system 620 in which one or more vessels 622 may be employed to enable seismic profiling, e.g., three-dimensional vertical seismic profiling (VSP) or rig/offset vertical seismic profiling (VSP). In the example of FIG. 6, the system 620 is illustrated as including a rig 650, the vessel 622, and one or more acoustic receivers 628 (e.g., a receiver array). As an example, a vessel may include a source 624 (e.g., or source array) and/or the rig 650 may include a source 624 (e.g., or source array).

As an example, the vessel 622 may travel a path or paths where locations may be recorded through the use of navigation system signals 636. As an example, such signals may be associated with a satellite-based system that includes one or more satellites 652 and 638. As an example, the satellite 638 may be part of a global positioning system (GPS), which may be implemented to record position, speed, direction, and other parameters of the vessel 622. As an example, one or more satellites, communication equipment, etc. may be configured to provide for VSAT communications, VHF communications, UHF communications, etc.

In the example of FIG. 6, the acoustic receivers 628 may be part of a data acquisition system 626, for example, that may be deployed in borehole 630 via one or more of a variety of delivery systems, such as wireline delivery systems, slickline delivery systems, and other suitable delivery systems. As an example, the acoustic receivers 628 may be communicatively coupled with processing equipment 658, which may be positioned at a downhole location. By way of example, processing equipment 658 may include a telemetry system for transmitting data from acoustic receivers 628 to additional processing equipment 662 located at the surface, e.g., on the rig 650 and/or vessels 622. As an example, information acquired may optionally be transmitted (see, e.g., signals 659).

Depending on the specifics of a given data communication system, examples of surface processing equipment 662 may include a radio repeater 660 and/or one or more of a variety of other and/or additional signal transfer components and signal processing components. The radio repeater 660 along with other components of processing equipment 662 may be used to communicate signals, e.g., UHF and/or VHF signals, between vessels (e.g., the vessel 622 and one or more other vessels) and the rig 650, for example, to enable further communication with downhole data acquisition system 626.

As an example, the acoustic receivers 628 may be coupled to the surface processing equipment 662 via one or more wire connections; noting that additionally or alternatively wireless and/or optical connections may be employed.

As an example, the surface processing equipment 662 may include a synchronization unit, for example, to assist with coordination of emissions from one or more sources (e.g., optionally dithered (delayed) source arrays). As an example, coordination may extend to one or more receivers (e.g., consider the acoustic receivers 628 located in borehole 630). As an example, a synchronization unit may use coordinated universal time, optionally employed in cooperation with a global positioning system (e.g., to obtain UTC data from GPS receivers of a GPS system).

FIG. 6 illustrates examples of equipment for performing seismic profiling that can employ simultaneous or near-simultaneous acquisition of seismic data. By way of example, the seismic profiling may include three-dimensional vertical seismic profiling (VSP) but other applications may utilize rig/offset vertical seismic profiling or seismic profiling employing walkaway lines. As an example, an offset source may be provided by the source 624 located on the rig 650, on the vessel 622, and/or on another vessel or structure (e.g., stationary and/or movable from one location to another location).

As an example, a system may employ one or more of various arrangements of a source or sources on a vessel(s) and/or a rig(s). As shown in the example of FIG. 6, the acoustic receivers 628 of downhole acquisition system 626 are configured to receive the source signals, at least some of which are reflected off a reflection boundary 664 located beneath a sea bottom 636. The acoustic receivers 628 may generate data streams that are relayed uphole to a suitable processing system, e.g., the processing system 662.

While the acoustic receivers 628 may generate data streams, a navigation system may determine a real-time speed, position, and direction of the vessel 622 and also estimate initial shot times accomplished via signal generators 654 of the appropriate source 624 (e.g., or source array). A source controller may be part of the surface processing equipment 662 (e.g., located on the rig 650, on the vessel 622, or at other suitable location) and may be configured with circuitry that can control firing of acoustic source generated signals so that the timing of an additional shot time (e.g., optionally a shot time via a slave vessel) may be based on an initial shot time (e.g., a shot time via a master vessel) plus a dither value.

As an example, a synchronization unit of, for example, the surface processing equipment 662, may coordinate firing of dithered acoustic signals with recording of acoustic signals by the downhole acquisition system 626. A processor system may be configured to separate a data stream of the initial shot and a data stream of the additional shot via a coherency filter. As an example, an approach may employ simultaneous acquisition and/or may not perform separation of the data streams. In such cases, the dither may be effectively zero.

After an initial shot time at T=0 (T0) is determined, subsequent firings of acoustic source arrays may be offset by a dither. The dithers may be positive or negative and sometimes created as pre-defined random delays. Use of dithers facilitates the separation of simultaneous or near-simultaneous data sets to simplify the data processing. The ability to have acoustic source arrays fire in simultaneous or near-simultaneous patterns can reduce the amount of time used for three-dimensional vertical seismic profiling source acquisition. This, in turn, may reduce rig time. As a result, the cost of the seismic operation may be reduced, rendering the data intensive process much more accessible.

If acoustic source arrays used in the seismic data acquisition are widely separated, the difference in move-outs across the acoustic receiver array of the wave fields generated by the acoustic sources can be sufficient to obtain a relatively clean data image via processing the data. However, even when acoustic sources are substantially co-located in time, data acquired a method involving dithering of the firing times of the individual sources may be processed to a formation image. For example, consider taking advantage of the incoherence of the data generated by one acoustic source when seen in the reference time of another acoustic source.

Also shown in FIG. 6 is an inset example of a zero-offset vertical seismic profile (VSP) scenario 690. In such an example, an acquisition geometry may be limited to an ability to position equipment that is physically coupled to the rig 650. As shown, for given the acquisition geometry, there may be no substantial offset between the source 624 and bore 630. In such an example, a zero-offset VSP may be acquired where seismic waves travel substantially vertically down to a reflector (e.g., the layer 664) and up to the receiver 628, which may be a receiver array. Where one or more vessels are employed (e.g., the vessel 622), one or more other types of surveys may be performed. As an example, a three-dimensional VSP may be performed using a vessel.

As an example, a 3D VSP technique may be implemented with respect to an onshore and/or an offshore environment. As an example, an acquisition technique for an onshore (e.g., land-based) survey may include positioning a source or sources along a line or lines of a grid; whereas, in an offshore implementation, source positions may be laid out in lines or in a spiral centered near a well.

A 3D acquisition technique may help to illuminate one or more 3D structures (e.g., one or more features in a geologic environment). Information acquired from a 3D VSP may assist with exploration and development, pre-job modeling and planning, etc. As an example, a 3D VSP may fill in one or more regions that lack surface seismic survey information, for example, due to interfering surface infrastructure or difficult subsurface conditions, such as, for example, shallow gas, which may disrupt propagation of P-waves (e.g., seismic energy traveling through fluid may exhibit signal characteristics that differ from those of seismic energy traveling through rock).

As an example, a VSP may find use to tie time-based surface seismic images to one or more depth-based well logs. For example, in an exploration area, a nearest well may be quite distant such that a VSP is not available for calibration before drilling begins on a new well. Without accurate time-depth correlation, depth estimates derived from surface seismic images may include some uncertainties, which may, for example, add risk and cost (e.g., as to contingency planning for drilling programs). As an example, a so-called intermediate VSP may be performed, for example, to help develop a time-depth correlation. For example, an intermediate VSP may include running a wireline VSP before reaching a total depth. Such a survey may, for example, provide for a relatively reliable time-depth conversion; however, it may also add cost and inefficiency to a drilling operation and, for example, it may come too late to forecast drilling trouble. As an example, a seismic while drilling process may be implemented, for example, to help reduce uncertainty in time-depth correlation without having to stop a drilling process. Such an approach may provide real-time seismic waveforms that can allow an operator to look ahead of a drill bit, for example, to help guide a drill string to a target total depth.

Figure 7:
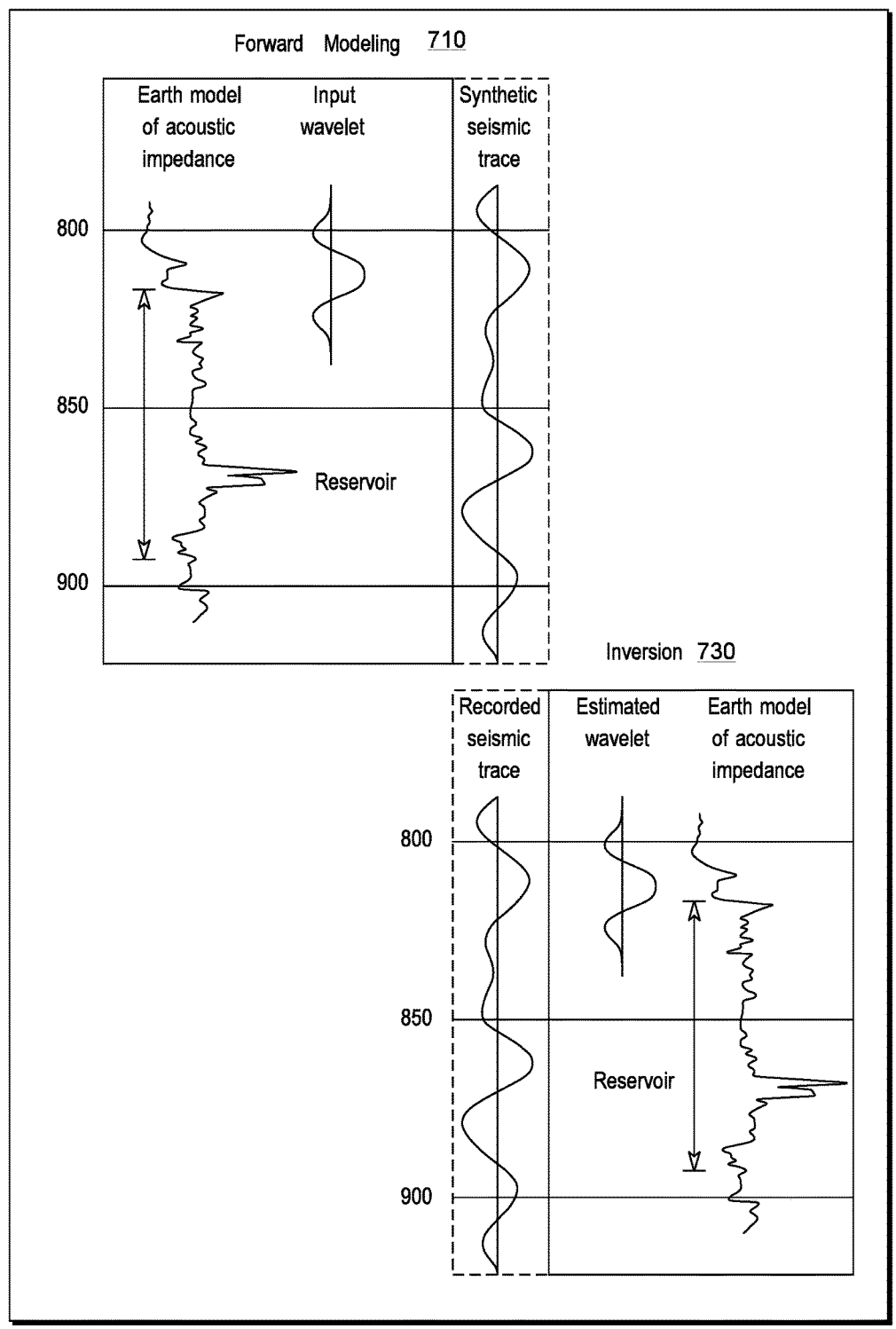
FIG. 7 illustrates examples of input and output information of forward modeling and inversion processes, respectively.

FIG. 7 shows an example of forward modeling 710 and an example of inversion 730 (e.g., an inversion or inverting). As shown, the forward modeling 710 progresses from an earth model of acoustic impedance and an input wavelet to a synthetic seismic trace while the inversion 730 progresses from a recorded seismic trace to an estimated wavelet and an Earth model of acoustic impedance. As an example, forward modeling can take a model of formation properties (e.g., acoustic impedance as may be available from well logs) and combine such information with a seismic wavelength (e.g., a pulse) to output one or more synthetic seismic traces while inversion can commence with a recorded seismic trace, account for effect(s) of an estimated wavelet (e.g., a pulse) to generate values of acoustic impedance for a series of points in time (e.g., depth).

As an example, as to forward modeling in seismic imaging, a forward operator F can be called Born modeling (e.g., or demigration) and an adjoint/imaging operator F* can be called migration (e.g., can be or include reverse-time migration). In such an example, F* may undo most of F in a kinematic sense. As an example, a method can include use of the Green's function in variable media. As an example, a two-point traveltime function may be considered that embodies a relationship between time and distance over wave speed (e.g., velocity). As an example, a method can include matching of traveltimes for inverting a wave speed profile.

As to traveltime, it can be defined as an elapsed time for a seismic wave to travel from its source to a given reflector and return to a receiver (e.g., at the Earth's surface, etc.). As an example, a minimum two-way traveltime can correspond to a scenario for a normal-incidence wave with zero offset. Zero offset data can be, for example, seismic data acquired with substantially no horizontal distance between a source and a receiver; noting that stacking seismic data acquired with separated sources and receivers can give the data an appearance of zero-offset data.

As an example, a method can employ a first-order Born approximation, which is a single scattering approximation that can be applied in seismology to approximate a perturbed wavefield due to a small perturbation of a reference medium. For example, the elastic response of a medium can be determined by using a forcing term and, for example, a small perturbation to a reference medium can be approximated as a small perturbation to an operator and a wavefield. For example, the first-order Born approximation may be written as, neglecting higher order terms:

$$_0 \delta u = \delta u_0 + \mathcal{O} (\delta^2)$$

where $_0$ is an integro-differential operator, $u_0$ is a reference wavefield, $\delta u_0$ is the effect of the perturbed medium operating on the reference wavefield and $\delta u$ is a perturbation of the reference wavefield (see, e.g., Panning et al., Seismic waveform modelling in a 3-D Earth using the Born approximation: potential shortcomings and a remedy, Geophys. J. Int. (2009) 177, 161-178, which is incorporated by reference herein; noting that, as an example, a method, a system, etc., may optionally utilize a modified Born formalism).

As to the Born approximation or Born modeling, a "single scattering" can be set forth such that, for each perturbed scattering point in a medium, scattering generated by the reference wavefield is considered. In such an example, energy in the scattered wavefield, $\delta u$, has interacted with a single scattering point. In such an example, effects of earlier scatterers on the reference wavefield can be neglected as recorded at the receiver. Thus, the Born approximation does not conserve energy, because it involves adding in a small scattered wavefield without change in the reference wavefield. The Born approximation can break down where a scattered wavefield becomes large relative to a reference wavefield. As an example, Born modeling can include defining kernels such as, for example, multidimensional sensitivity kernels that can be integrated over a volume of material where a model vector can describe perturbations to elastic coefficients and density.

As an example, an inversion process can commence with forward modeling, for example, to provide a model of layers with estimated formation depths, thicknesses, densities and velocities, which may, for example, be based at least in part on information such as well log information (see, e.g., the acoustic impedance model of FIG. 7). A model may account for compressional wave velocities and density, which may be used to invert for P-wave, or acoustic, impedance. As an example, a model can account for shear velocities and, for example, solve for S-wave, or elastic, impedance. As an example, a model may be combined with a seismic wavelet (e.g., a pulse) to generate a synthetic seismic trace (see, e.g., the input wavelet and synthetic seismic trace of FIG. 7).

Inversion can aim to generate a "best-fit" model by, for example, iterating between forward modeling and inversion while seeking to minimize differences between a synthetic trace or traces and actual seismic data (see, e.g., forward modeling 710 and inversion 730 of FIG. 7).

As an example, inversion can include full waveform inversion (FWI). FWI may be suitable for one or more acquisition geometries. For example, consider wide-azimuth (WAZ) and full-azimuth (FAZ) surveys. As an example, a time-domain implementation can complement RTM and, for example, produce results that may compare well to frequency-domain inversion while, for example, being computationally efficient in 3D.

As an example, a wide-azimuth seismic survey can utilize offsets that may be of the order of 1,000 meters or more. For example, consider a WAZ that utilizes increased azimuth distribution for offsets of the order of several kilometers or more. As an example, a full-azimuth seismic survey may aim to approximate 360 degrees of azimuth coverage for offsets. As an example, a survey that implements limited azimuth coverage (e.g., at offsets beyond about 4 km), may result in insufficient illumination of one or more complex subsurface structures. As an example, a survey may aim to properly illuminate subsurface points associated with a subsurface target or target region of a geologic environment. As an example, a seismic survey may aim to record a sufficient amount of reflected seismic energy via a distribution of source-receiver offsets, azimuths and incidence angles.

As an example, a framework such as the ISIS inversion framework (Schlumberger Limited, Houston Tex.) may be implemented to perform an inversion. As an example, such an inversion framework may be included in and/or operatively coupled to a framework such as, for example, the OMEGA® framework. As an example, coupled features in one or more frameworks may provide for and/or enhance simultaneous types of inversions (e.g., simultaneous AVO inversion, etc.), static inversions, dynamic inversions, rock physics modeling, lithology classifying, etc.

As an example, a workflow can include seismic data acquisition, log data acquisition (e.g., well data, etc.), wavelet analysis (e.g., wavelet extraction), inversion, rock physics determinations (e.g., via physical relationships between seismic data and reservoir properties, etc.) and reservoir modeling (e.g., earth modeling, etc.), which can include spatial modeling and property population of a model.

Figure 8:
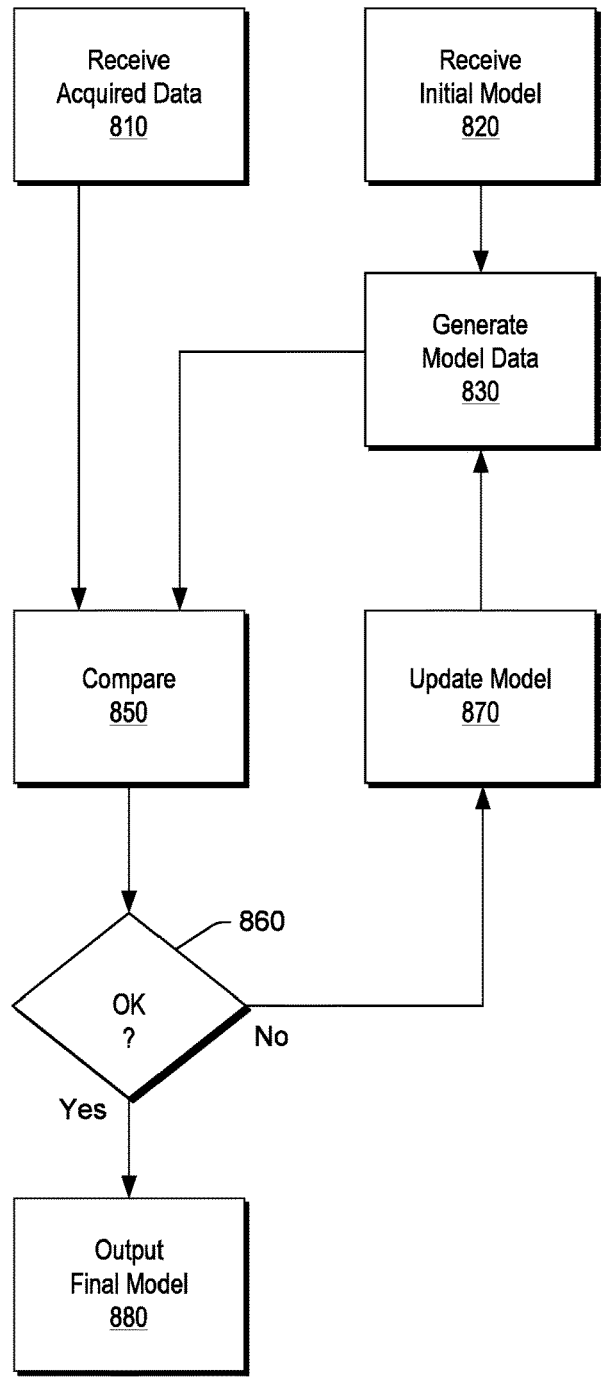
FIG. 8 illustrates an example of a method that includes inversion.

FIG. 8 shows an example of a method 800 that includes a reception block 810 for receiving acquired data, a reception block 820 for receiving an initial model, a generation block 830 for generating model data based at least in part on a model, a comparison block 850 for comparing the acquired data to the model data, a decision block 860 for deciding whether a model adequately represents at least a portion of a geologic environment, an update block 870 for updating a model and an output block 880 for outputting a final model.

As an example, the method 800 of FIG. 8 can be utilized to generate an acceptable model of a geologic environment. As an example, a method can include full waveform inversion (FWI). For example, FWI may be implemented as part of a velocity model building process based at least in part on a wave equation such as, for example, a full two-way wave equation. As an example, ray tracing may be utilized to distribute velocity errors within a model. As an example, a framework (e.g., the OMEGA® framework, etc.) may be utilized for ray tracing and illumination (RTI) via velocity models (e.g., isotropic, anisotropic, etc.).

As an example, FWI may be implemented as a data-fitting process that aims to reconstruct a relatively high-resolution velocity model of a subsurface region of a geologic environment based at least in part on seismic data. As an example, FWI can employ a diffraction tomography principle such that in a framework of the single-scattering approximation, the spatial frequency vector, k, sampled in an image at a diffractor point is related to the local wavelength and the scattering angle according to:

$$k = \frac{2\omega}{c_0} \cos\left(\frac{\theta}{2}\right) n$$

where $\omega$ is the angular frequency, $c_0$ is the local wave speed and n is the direction formed by the sum of the two slowness vectors, which can be associated with the rays that connect a source and a receiver at a diffractor point.

In seismology, slowness can refer to interval transit time, which can be defined as an amount of time for a wave to travel a certain distance, proportional to the reciprocal of velocity. As an example, P-wave interval transit times for various sedimentary rock types can range from about 43 microseconds per foot (e.g., dolostone) to about 160 microseconds per foot (e.g., unconsolidated shales); noting that steel casing may have a transit time of about 57 microseconds per foot. As mentioned, two slowness vectors can be defined at least in part via rays that can connect a source and a receiver at a diffractor point.

As to a full two-way wave equation (e.g., "two-ways" wave equation, etc.), such an equation finds use in migration such as, for example, reverse-time migration (RTM). As an example, RTM may be employed as to complex regions of a geologic environment such as, for example, regions that may include one or more salt bodies (e.g., Gulf of Mexico, offshore West Africa, Brazil, the Red Sea, etc.).

As to a velocity model, velocity can be seismic velocity. For example, seismic velocity can be the rate at which a seismic wave travels through a medium, that is, distance divided by traveltime. As an example, seismic velocity can be determined from vertical seismic profiles and/or from velocity analysis of seismic data. As an example, seismic velocity can vary vertically, laterally and/or azimuthally in anisotropic media and seismic velocity tends to increase with depth in the Earth because compaction tends to reduce porosity. Velocity may vary as a function of how it is derived from the data. For example, the stacking velocity derived from normal moveout measurements (NMO) of common depth point gathers can differ from the average velocity measured vertically from a check-shot or vertical seismic profile (VSP).

As an example, subsurface complexity (e.g., strong velocity or anisotropic parameter variations or complex geological formations such as salt and basalt structures, heavily faulted zones, anisotropic environments due to sedimentation or fracturing, overthrusts, shallow gas, and others) can drive factors such as velocity model accuracy and resolution.

As explained with respect to the method 800 of FIG. 8, building a velocity model can be an iterative process, which can include structural interpretation and modeling, velocity and anisotropic parameter analysis and modeling, and velocity updates.

As an example, velocity modeling can include structural modeling and layer definition based on geological rules and property population (e.g., velocity and anisotropic parameters), for example, using geological conformance as appropriate and specific resolution for each property and each layer. As an example, structural and velocity information may be described in a compact velocity model that may be, for example, directly ray traceable by one or more ray tracing-based applications (e.g., CIP tomography, seismic forward modeling, illumination studies and Kirchhoff prestack depth migration).

As an example, a full waveform inversion (FWI) may involve one or more numerical technique such as, for example, the finite difference method to discretize a time-space domain or, for example, a frequency domain. As an example, a full waveform inversion (FWI) may be applied in a three-dimensional manner, for example, via 3D seismic cubes (e.g., seismic volumes) of marine and/or land data.

As mentioned, a modeling process can be iterative. For example, a full wave inversion (FWI) process can include iterating to achieve convergence to a solution. As an example, an iterative process can commence using an initial solution where calculations are performed to output a refined solution. For example, an initial solution may be an initial velocity field where the refined solution is expected to more accurately match data acquired via one or more seismic surveys.

In iterative processes that aim to converge to a solution, a cost function may be minimized or maximized. Where minimization is implemented, a process can aim to achieve a converged solution that corresponds to a global minimum and, for example, where maximization is implemented, a process can aim to achieve a converged solution that corresponds to a global maximum. However, solution spaces tend to include localities that can present as local minima or local maxima. As an example, analyses of minima or maxima may involve convexity analysis, for example, as to a feasible region and/or an objective function.

As an example, in velocity model building, updating can occur iteratively commencing with an initial velocity field (e.g., a guess, an informed guess, etc.). Whether a solution arrives at a local or global minima (e.g., or maxima) can depend on the nature of the initial velocity field. As an example, a method can include providing information that can be included in an initial velocity field that aims to avoid landing at a local minima (e.g., or maxima). For example, consider a method that provides low frequency information, long offset information, etc.

As an example, a model can be a depth model that models material in a geologic environment with respect to depth (see, e.g., FIG. 7 where the axis can be depth); noting that a model may be, for example, a 1D, 2D or 3D model (e.g., in a Cartesian or another type of coordinate system).

As shown in the example of FIG. 8, a method can include comparing modeled seismic data to real prestack seismic data (e.g., seismic measurements) where errors can be backwards propagated into a velocity model in an iterative manner to reach a final velocity model, which can be expected to be more detailed than an initial velocity model. Such a process can be referred to as a model refinement process that, for example, aims to increase model resolution (e.g., to understand better structures in a geologic environment, etc.).

As an example, an initial velocity model may be built from legacy velocities, well logs, non-seismic measurements, etc. As an example, a method may employ elastic correction. As an example, a method may employ one or more two-way wavefield propagation algorithms.

As an example, a full waveform inversion (FWI) method can include partitioning of a space. For example, a method can include decomposing a space into parts. As an example, consider a method that includes decomposing a model of a subsurface region into a background part and a singular part. In such an example, the background part can be an updatable part and the singular part can correspond to information known about reflectivity in the subsurface region (e.g., seismic reflectivity associated with structure). Such an approach may be referred to as scale based uncoupling. Such an approach may, for example, bring out the transmitted wavepaths that connect sources and receivers to reflectors in a sensitivity kernel of a full waveform inversion (FWI), which may otherwise be impacted by the migration impulse responses formed by the correlation of the downgoing direct wavefields coming from source and receiver positions. As an example, via a partitioning approach, long-to-intermediate wavelengths of a background model can be updated via, for example, wide scattering-angle information. As an example, via a partitioning approach, a suitable misfit measurement based on cross-correlation may be employed, for example, to relax updating of reflectivity information at each non-linear iteration of a full waveform inversion (FWI), which can reduce computational demands (see, e.g., Brossier et al., Velocity model building from seismic reflection data by full-waveform inversion: Geophysical Prospecting, 2015, 63, 354-367 (article first published online: 11 Nov. 2014), which is incorporated by reference herein).

As an example, FWI can be cast in terms of minimizing differences between observed and computed data, for example, in a least squares sense. For example, a misfit function may be minimized. In such an example, a derivative of the misfit function may be taken with respect to velocity, as the gradient of the misfit function. Such an approach can include the Fréchet derivative of data at a time t and at an offset h (e.g., a source-receiver offset), which may be computed, for example, via an adjoint-state method. As an example, a weighted-time cross-correlation misfit function may be employed, for example, to handle time (phase) delay that is larger than half a period.

As an example, FWI can be defined as a full wave propagation based inversion technique. FWI may be employed for refining seismic velocity fields, which may, for example, benefit one or more migration techniques that aim to achieve enhanced subsurface images.

As mentioned, FWI can include iteratively updating a subsurface earth model to reduce a value or values of a misfit function as to a difference or differences between recorded seismic data and simulated waveforms. Such an approach may aim to explain the so-called "full waveform" (e.g., primary, multiples, converted waves, etc.) of acquired seismic data via an inverted subsurface earth model. Resolution and stability of FWI tends to correspond to long-offset, wide-bandwidth, wide-azimuth and wide-aperture seismic data, or in other words, what may be referred to as fully recorded seismic wavefields.

As explained, FWI can be implemented in a manner that aims to minimize a mean-square difference between observed/acquired data and simulated/predicted data. For example, consider the following equation:

$$\min_m \frac{1}{2} \|p[m]d\|^2, \quad (1)$$

where m stands for the subsurface model, d is the observed seismogram, and p[m] denotes the prediction computed by solving wave equations via a technique such as, for example, the finite difference method, on a possible subsurface model m.

As mentioned, a challenge in implementing FWI can be associated with local minima/non-uniqueness, which may be caused at least in part by cycle skipping between predicted and observed data. Such an issue may be attributed to observed data that lack low frequency information, for example, due to physical limitation in data acquisition and/or noises in the recorded seismic signal.

As to low frequency information of seismic data (e.g., low frequency content, low frequency energy, etc.), as an example, its presence can enhance inversion to acoustic impedance. For example, an inversion process may benefit from seismic data with a bandwidth extending down to approximately 0 Hz. As an example, a range of lowest frequencies (e.g., from about 0 Hz to about 3 Hz) may, if available, be supplied via well data or, for example, in absence of sufficient well data, from a velocity profile. Extension of seismic data bandwidth to a low frequency value (e.g., towards 3 Hz or less), can enhance the results of an inversion workflow.

As to seismic imaging of so-called deep targets, high frequencies tend to be progressively absorbed by the earth; thus, to enhance resolution at depth, an approach can include extending the bandwidth at a low end of a spectrum. As an example, to image beneath high-velocity and/or highly absorbing formations, a method can include one or more techniques that aim to effectively increase low frequency content of a source signature.

As mentioned, a FWI approach can include receiving an initial model that may be expected to be reasonably "close" to a true model, which can be equated to recoded data that includes sufficient transmitted energy (e.g., diving and refracted waves) that illuminates one or more target subsurface regions (e.g., in shallow depths of a model). In FWI, for seismic reflection data, a smooth background model or low wave-number components of the model can be considered to be accurate enough to commence a FWI process (e.g., to serve as an initial guess).

As an example, a method can include employing one or more anti-local minima algorithms. For example, one or more algorithms may aim to mitigate local minima issues of an FWI method involving seismic reflection data.

As mentioned, a model of a subsurface region can be decomposed (e.g., partitioned) into a smooth background, which is sought to be updated via minimizing an objective function, and a rough reflectivity, which is to be computed through a chosen migration or least-squares migration at a current background.

As an example, with such model decomposition and Born modeling, a method can include extracting the low-wavenumber component of a FWI gradient. In such an example, in an effort to guarantee that this low-wavenumber component contributes to updating the background model in an appropriate direction, an optimization strategy may be employed that includes: firstly, computing an offset-dependent matching filter to match the predicted Born modeled wavefield and observed reflections; and secondly, measuring the incoherency of this offset-dependent filter along offset and time, and then updating the background model to minimize this incoherency.

Numerical trials with both synthetic and real data demonstrate the ability of such an approach (e.g., a matching filter and incoherency measurement approach) in constructing kinematically adequate background models. As an example, starting from an adjusted background model, FWI can be implemented to further improve accuracy and resolution of the constructed model.

As an example, a method can include adjusting a background model for reflection seismic data in a manner that can mitigate local minima issues and, for example, improve robustness of FWI, particularly where an initial model may be somewhat inaccurate (e.g., include inaccuracies, etc.).

As an example, a method may include one or more time-domain algorithms that, for example, can scale to large 3D problems. As an example, a method can include iteratively building a velocity model by minimizing a misfit function (see, e.g., Equation 1) that represents the difference between acquired data and the simulated data. Such a non-linear inverse problem can be solved by an iterative gradient-related optimization approach with, for example, a line search or a trust region globalization strategy.

As an example, a gradient can be computed with an adjoint-state method, which can include computing source and receiver wavefields respectively via forward and backward propagations, and cross-correlating source and receiver wavefields in time at each subsurface locations to form the gradient.

As to local minima, due to various reasons, such as nonlinearity relation between data and model, large degree of freedom and imperfection of acquired data, FWI can be an ill-posed nonlinear inverse problem. For example, more than one model may generate data within certain data-fitting tolerances.

Figure 9:
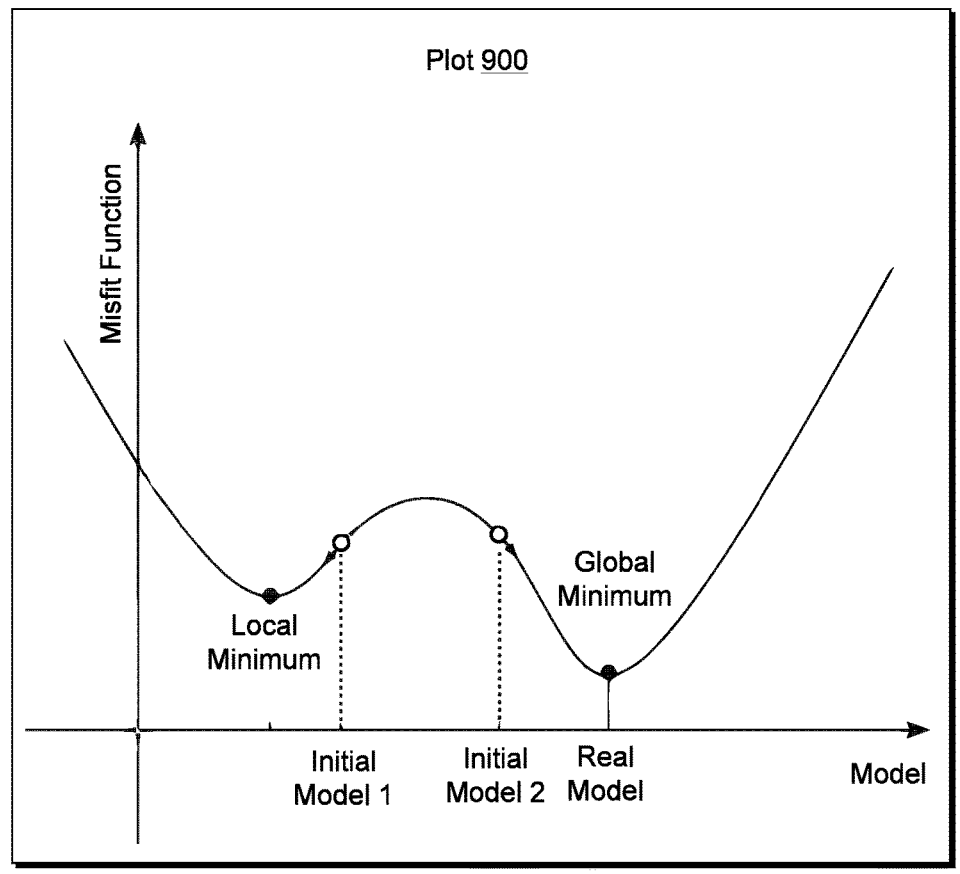
FIG. 9 illustrates an example of non-convexity of an example of an inversion objective function and its intrinsic minima including local and global minima.

FIG. 9 shows an example of a plot 900 that approximates a scenario that includes a local minimum and a global minimum. As shown in FIG. 9, if a FWI process starts with an initial model 1, it will converge to the local minimum on the left, instead of converging to the global minimum on the right side; whereas, if the FWI process starts with the initial model 2 which is in the valley of the global minimum, it will converge to the global minimum (e.g., downhill to its right).

As an example, in a FWI process different gradient components can have different impacts. For example, both low-wavenumber and high-wavenumber components reside in the gradient of FWI where, for seismic data with sufficient transmitted energy (e.g., long-offset data with rich diving waves and refractions), the low-wavenumber component will dominate and thus, in this scenario, a FWI process or inversion based on some alternative objective functional can effectively build kinematically appropriate low-wavenumber model, for example, for shallow regions well illuminated by transmitted energy; whereas, for seismic data dominated by reflections, the high wavenumber component will dominate, and a FWI process may not be amenable to provide low-wavenumber updates, for example, in deep regions.

As an example, a method can include promoting low-wavenumber model updates during inversion. As an example, a method may include reweighting different components of a FWI gradient and recombining them to emphasize a low-wavenumber component. As an example, a data domain approach or migration velocity analysis approach can include decomposing a subsurface model into a smooth background and a rough reflectivity. As an example, with such a model decomposition approach and, for example, Born approximation, a method can include explicitly computing the low-wavenumber background gradient.

As an example, a method can include model decomposition. In such an example, the method can include ensuring that a computed low-wavenumber gradient component contributes to updating the background model in an appropriate direction, that is, to mitigate cycle-skips.

As an example, a method can include coherent optimization. For example, consider a method that includes computing an offset-dependent matching filter to match a predicted Born wavefield and observed reflections; measuring the incoherency of such an offset-dependent filter along offset and time; and updating background to minimize the measured incoherency.

Figure 10:
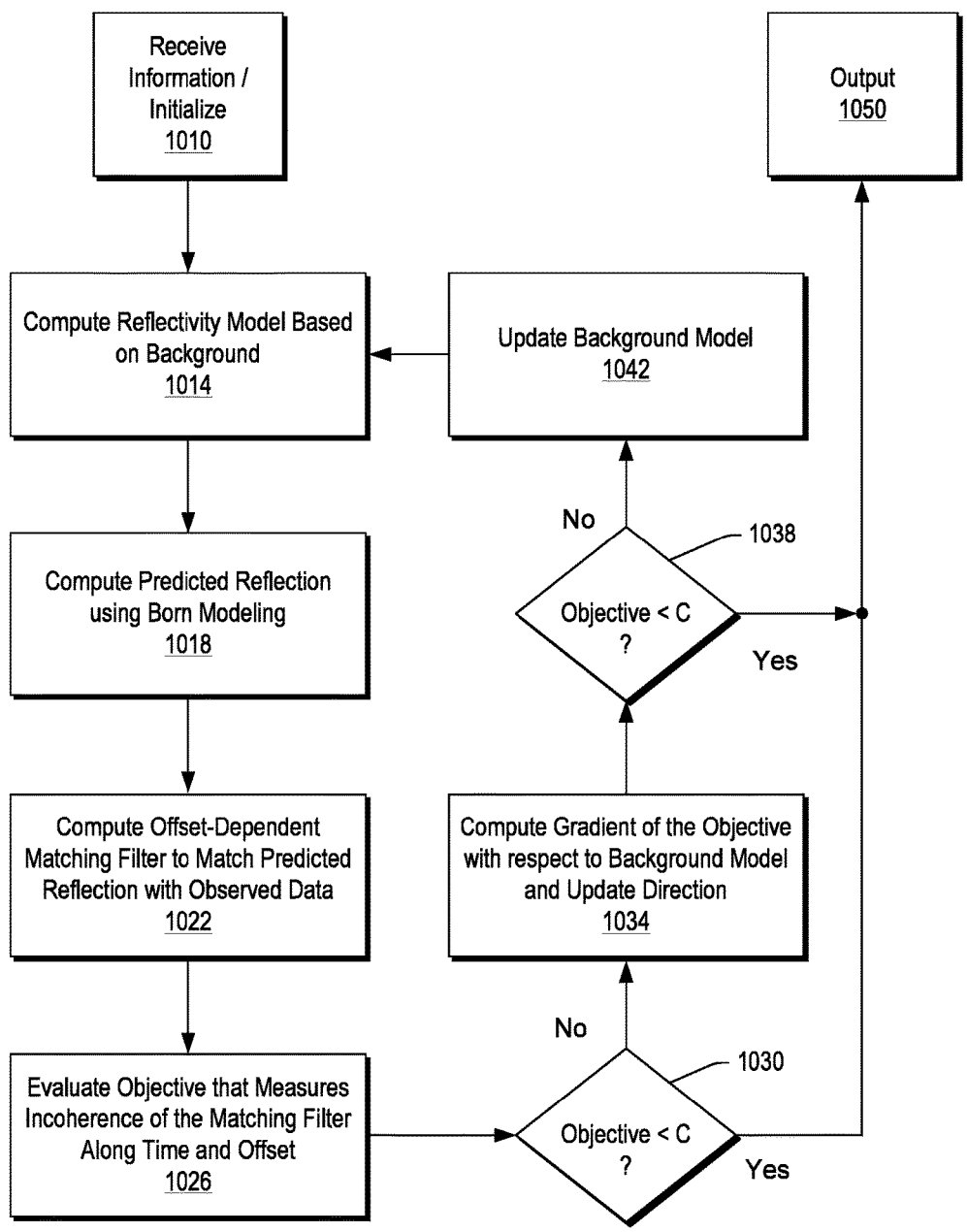
FIG. 10 illustrates an example of a method that includes reflection information based inversion.

FIG. 10 shows an example of a method 1000 that includes a reception block 1010 for receiving information to initialize; a computation block 1020 for computing a reflectivity model based on background; a computation block 1018 for computing predicted reflection using Born modeling; a computation block 1022 for computing an offset-dependent matching filter to match the predicted reflection with observed data (e.g., as received via the reception block 1010); an evaluation block 1026 for evaluating an objective (e.g., an objective function) that measures incoherence of the matching filter along time and offset; a decision block 1030 for deciding if the objective is less than a criterion value; a computation block 1034 for computing the gradient of the objective with respect to the background model and updating direction; another decision block 1038 for deciding if the objective is less than a criterion value; an update block 1042 for updating the background model; and an output block 1050 for outputting information such as, for example, an adjusted model of a geologic environment.

For seismic data that tends to be dominated by reflected energy, reflections can be used to build up a kinematically appropriate low-wavenumber background of a model, particularly in one or more deep regions of a geologic environment that are not readily amenable to illumination by transmitted waves.

As an example, assume that observed data d includes, predominantly, reflections. In such an example, consider that a model m is composed of a smooth low-wavenumber component v (e.g., a background or macro part or smooth background part) and a rough high-wavenumber component r (e.g., reflectivity or rough reflectivity part), such that:

$$m=v(1+r).$$

In such an example, the predicted reflection Sp can be computed through a Born modeling (e.g., or de-migration) procedure, which may be defined as, for example:

$$\delta p[v,r]:=F[v]r$$

where F[v] denotes the Born operator at background model v.

As an example, a method can include solving the following inverse problem:

Given observed reflections d, find v, r so that F[v]r is close to d.

As indicated in the foregoing example, a model m can be a decomposed model or a partitioned model that includes parts: a background part and a reflectivity part (e.g., a smooth background part and a rough reflectivity part). And, in such an example, Born modeling can be utilized to determine predicted reflections (e.g., via use of the Born operator). As stated above, for given data, which can be in the form of reflections (e.g., based on acquired seismic data in a geologic environment), an inverse problem can aim to find model parts such that predicted reflections match observed reflections (e.g., reflections in acquired seismic data).

As an example, reflectivity can characterize a ratio of amplitude of a reflected wave to amplitude of an incident wave for a reflector. Such a ratio can characterize an amount of reflected energy with respect to incident energy. As an example, for seismic data that tends to be dominated by reflected energy, a method can include using reflections to build up a kinematically acceptable low-wavenumber background part of a partitioned model. Such an approach may be utilized, for example, as a part of a method that aims to characterize relatively deep regions that may not be sufficiently illuminated by transmitted waves.

As an example, a method can include implementing an algorithm that helps to assure that a computed low-wavenumber gradient component contributes to updating a background model in the appropriate direction. Such an algorithm can include, for example, determining an offset-dependent matching filter that aims to match a predicted Born wavefield and observed reflections and measuring incoherency of such an offset-dependent filter along offset and time and then updating the background model in a manner that minimizes (e.g., reduces) the measured incoherency.

In a geologic environment, v tends to dominate kinematics of a predicted wavefield; and, if v is close to the "true" low-wavenumber background, r derived from, for example, migration or least-squares migration can present reflectors at appropriate locations; otherwise, if v is far from the "true" background model, r derived from the same procedure can present reflectors at inappropriate locations or, for example, fail to indicate the presence of one or more coherent reflectors in one or more complex regions. For example, when the background v is "wrong", one may neither obtain a focused r through migrating the dataset d with different offsets, nor achieve a high quality r through least-squares migration to fit the dataset.

As an example, a method can include utilizing an extended matching filter. For example, for a reflectivity r[v] computed with, for example, a chosen migration or least-squares migration for a current background model, a method can include computing an offset-dependent matching filter s[δp] that aims to match the Born prediction δp[v]=F[v]r with d via solving, for example, the following least-squares-based filter estimation problem:

$$G[\delta p]^T G[\delta p]s = G[\delta p]^T d \qquad (2)$$

where G[δp] denotes the convolution operator based on the Born prediction δp[v], and G[δp]$^T$ stands for its adjoint operator. Equation (2) may be solved, for example, using a direct Toeplitz solver (e.g., a computational solver that can solve a Toeplitz system of equations).

As an example, r[v] may be computed via a chosen migration or least-squares migration. For example, when v is close to the "true" background, as the predicted reflection δp[v] exhibits appropriate kinematics over different offsets, the computed matching filter s(τ, $x_r$; $x_s$) for each trace located at $x_r$ of each shot located at $x_s$ will tend to be quite similar along $x_r$; and, for each $x_r$, the filter s(τ, $x_r$; $x_s$) will tend to focus around τ=0. Further, it may be expected to have a shape akin to a delta function, for example, if both an appropriate source wavelet and an appropriate r are achieved; otherwise, in a relatively unlikely case, either the source wavelet or r can be inaccurate, which may, for example, look like some type of wavelet focused around τ=0.

As an example, a method can include updating v through minimizing the incoherency of s(τ, $x_r$; $x_s$) along $x_r$ and the deviation from τ=0. As an example, an optimization problem can be formulated as:

$$\min_v J[v] \frac{1}{2} \|A[s]\|^2 \qquad (3)$$
$$\text{s.t.} \quad G[\delta p]^T G[\delta p]s = G[\delta p]^T d$$
$$\delta p = F[v]r[v]$$

where A measures the incoherency of s along offset or the deviation from τ=0, e.g., a choice for A may be:

$$A[s] := \frac{1}{\|s\|} \frac{\partial s}{\partial x_r} \text{ or} \qquad (4)$$

$$A[s] := \frac{\tau s}{\|s\|}. \qquad (5)$$

The foregoing example objective function involves a coherency minimization concept of differential semblance optimization; and, as it is in a data domain, such an approach can proceed without a demand to form image domain gathers.

As an example, a method can include computing a gradient (see, e.g., the block 1034 of FIG. 10). For example, using the chain rule and adjoint-state derivation, the gradient of J[v] with respect to v can be written as, for example:

$$\nabla J = D_v \delta p^T D_{\delta p} s^T D_s A^T A[s], \qquad (6)$$

where $D_sA$, $D_{\delta p}s$, and $D_v\delta p$ are the derivative operators of A[s], s[δp], and δp[v], respectively; where $D_sA^T$, $D_{\delta p}s^T$, and $D_v\delta p^T$ stand for the corresponding adjoint operators.

In such an example, the operator $D_v\delta p^T$ can explicitly generate the low-wavenumber component; and, $D_sA^T$ can carry information of a desired updating direction (e.g., appropriate updating direction). Thus, an adjoint operate can be utilized to determine an appropriate updating direction for a background model.

As an example, synthetic trials demonstrate that for seismic reflection data, a method such as, for example, the method 1000 of FIG. 10, can achieve successful inversion of the background/low wave-number components of a model and, to at least some extent, mitigate cycle skipping issues. Field data trials demonstrate that a method such as, for example, the method 1000 of FIG. 10, can improve kinematic responses, for example, when compared to algorithms such as direct subtraction and phase-only objective function.

As an example, a method can be implemented for seismic reflection data to construct kinematically appropriate background models, starting from which one or more types of FWI can further improve the quality of models, for example, with an aim to achieve high fidelity and resolution of subsurface earth models.

As an example, a method can include decomposing a subsurface model into a smooth background part and a rough reflectivity part. In such an example, via model decomposition and associated Born modeling, the low-wavenumber gradient with respect to background can be computed explicitly. As an example, such a method can include computing an extended offset and time dependent matching filter to match the Born prediction with observed reflections (e.g., acquired data). In such an example, the method can include computing incoherency of the extended matching filter, and the gradient of such measurements with respect to the extended filter, which can dictate an appropriate direction for low-wavenumber background updates. As an example, a method can include determining a direction for one or more updates to a background model. For example, such a method can include using information of an adjoint operator to determine an appropriate direction.

As an example, a method may be implemented alone and/or within a workflow. For example, consider an approach where a method is implemented before implementation of FWI, after FWI and/or before and after FWI.

Figure 11:
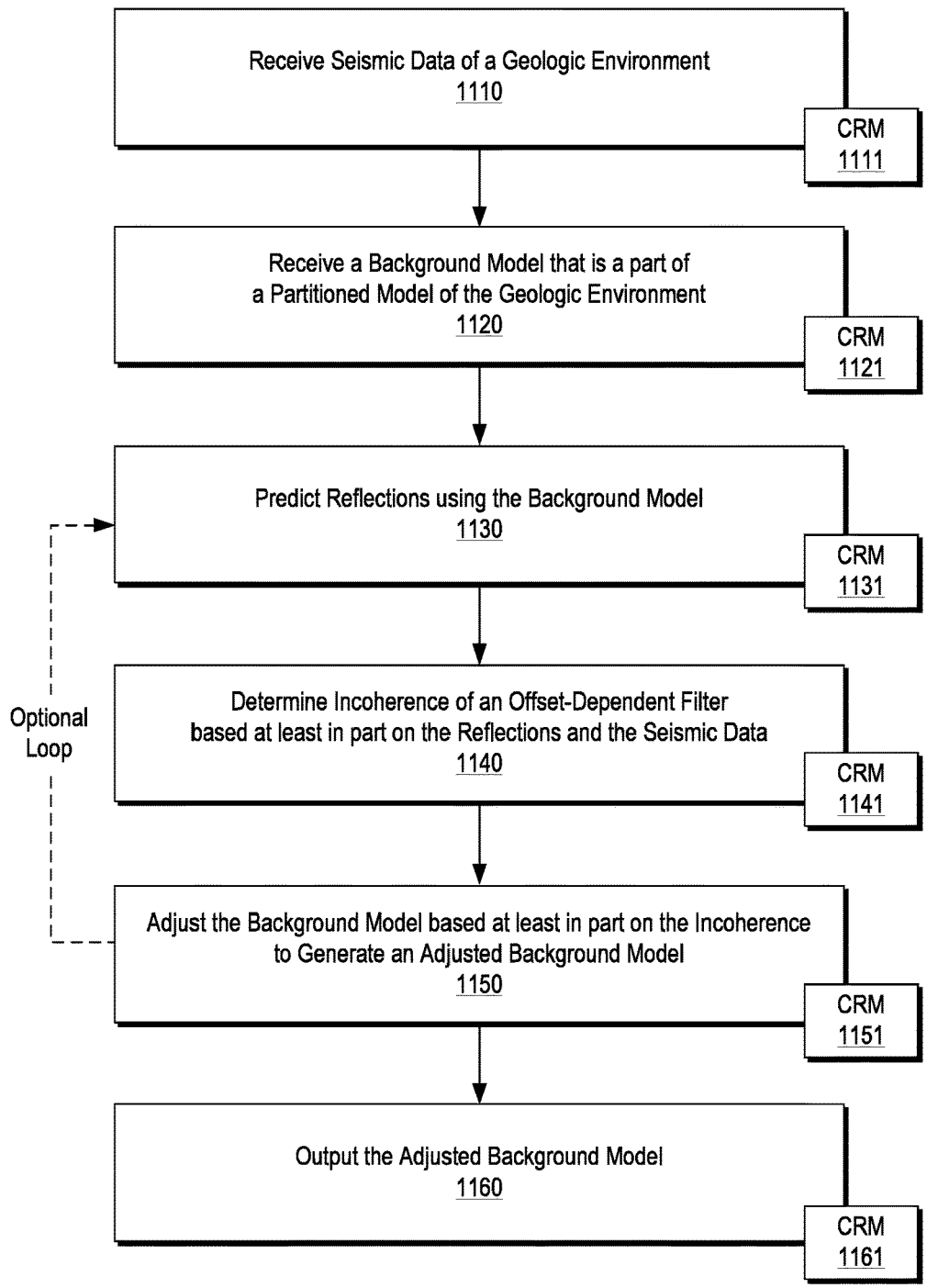
FIG. 11 illustrates an example of a method that includes reflection information based inversion.

FIG. 11 shows an example of a method 1100 that can include a reception block 1110 for receiving seismic data of a geologic environment; a reception block 1120 for receiving a background model that is a part of a partitioned model of the geologic environment; a prediction block 1130 for predicting reflections using the background model; a determination block 1140 for determining incoherence of an offset-dependent matching filter based at least in part on the reflections and the seismic data; an adjustment block 1150 for, based at least in part on the incoherence, adjusting the background model to generate an adjusted background model; and an output block 1160 for outputting the adjusted background model.

In the example of FIG. 11, the method 1100 can optionally include a loop where an adjusted background model is utilized to predict reflections, for example, until incoherence of the offset-dependent filter is reduced to a desired level, until an iteration counter reaches a limit, etc. As an example, an adjusted background model may be output to a FWI method that utilizes the adjusted background model to perform an inversion and to output a model such as an earth model.

The method 1100 is shown in FIG. 11 in association with various computer-readable media (CRM) blocks 1111, 1121, 1131, 1141, 1151 and 1161. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1100. As an example, a computer-readable medium (CRM) may be a computer-readable storage medium. As an example, the blocks 1111, 1121, 1131, 1141, 1151 and 1161 may be provided as one or more modules, for example, such as the one or more modules and/or instructions 1202 of the system 1200 of FIG. 12.

As an example, a partitioned model can be a decomposed model where one part of the decomposed model is a background model. As an example, the Born modeling can be applied to extract the low-wavenumber component of a FWI gradient. As an example, to an optimization algorithm can determine whether the low-wavenumber component can contribute to updating a background model in an appropriate direction. For example, consider a method that includes computing an offset-dependent matching filter that aims to match a predicted Born wavefield and observed reflections; determining incoherency of the offset-dependent matching filter along offset and time; and updating the background model in an effort to minimize the incoherency.

As an example, a method can include receiving seismic data representing a subsurface geological formation; decomposing the subsurface model into a background model and a reflectivity model; computing a predicted reflection of the subsurface geological formation; computing an offset-dependent matching filter to match the predicted reflection with the received seismic data; and updating the background model by iteratively minimizing the incoherency of the filter.

As an example, a non-transitory computer-readable medium storing instructions that, when executed by one or more processors of a computing system, can cause the computing system to perform operations where the operations can include receiving seismic data representing a subsurface geological formation; decomposing the subsurface model into a background model and a reflectivity model; computing a predicted reflection of the subsurface geological formation; computing an offset-dependent matching filter to match the predicted reflection with the received seismic data; and updating the background model by iteratively minimizing the incoherency of the filter.

As an example, a computing system can include one or more processors; and a memory system that includes one or more non-transitory computer-readable media storing instructions that, when executed by at least one of the one or more processors, can cause the computing system to perform operations where the operations include receiving seismic data representing a subsurface geological formation; decomposing the subsurface model into a background model and a reflectivity model; computing a predicted reflection of the subsurface geological formation; computing an offset dependent matching filter to match the predicted reflection with the received seismic data; and updating the background model by iteratively minimizing the incoherency of the filter.

As an example, a method can include receiving seismic data of a geologic environment; receiving a background model that is a part of a partitioned model of the geologic environment; predicting reflections using the background model; determining incoherence of an offset-dependent matching filter based at least in part on the reflections and the seismic data; based at least in part on the incoherence, adjusting the background model to generate an adjusted background model; and outputting the adjusted background model. In such an example, the method may include performing a full waveform inversion based at least in part on the adjusted background model to output, for example, an earth model of the geologic environment. As an example, a method can include a loop where, for example, iterations occur that aim to reduce incoherence of an offset-dependent matching filter. In such an example, an adjusted background model may be output upon reaching a desired level of incoherence, upon reaching a desired reduction in incoherence, upon reaching an iteration limit, etc.

As an example, a partitioned model can include a background model and a reflectivity model. In such an example, the background model can correspond to a low-wavenumber component model and the reflectivity model can correspond to a high-wavenumber component model. As an example, a background model can be a smooth background model and a reflectivity model can be a rough reflectivity model.

As an example, a method can include predicting reflections via Born modeling. For example, a method can include predicting reflections by applying a Born operator to a background model. As an example, predicted reflections can be reflections of a predicted Born wavefield.

As an example, a model can be represented as a partitioned model as follows: $m=v(1+r)$. As an example, a method can include predicting reflection $\delta p$ via Born modeling (e.g., or de-migration), for example, as follows: $\delta p[v,r]:=F[v]r$ where $F[v]$ denotes the Born operator at background model $v$. As an example, a method can aim to solve a problem cast as: given observed reflections $d$ find $v, r$ such that $F[v]r$ is close to $d$.

As an example, a method can include receiving seismic data acquired via sensors positioned in a geologic environment. In such an example, the seismic data carries information about the physical structure of the geologic environment.

As an example, a method can include partitioning a model of a geologic environment to form a background model and a reflectivity model.

As an example, a method can include adjusting a background model to generate an adjusted background model, for example, via reducing the incoherence of an offset-dependent matching filter (e.g., an extended matching filter).

As an example, a method can include determining incoherence of an offset-dependent matching filter, for example, via determining incoherence along offset and time.

As an example, a method can include determining an offset-dependent matching filter via a least-squares filter estimation formulation and a Toeplitz solver. As an example, a method can include determining an offset-dependent matching filter via implementing a Toeplitz solver.

As an example, a method can include adjusting a background model to generate an adjusted background model via determining a gradient of an objective function with respect to the background model. In such an example, an adjoint operator can carry information as to an appropriate adjustment direction for adjusting the background model.

As an example, a system can include a processor; memory accessible by the processor; and processor-executable instructions stored in the memory that include processor-executable instructions to instruct the system to receive seismic data of a geologic environment, receive a background model that is a part of a partitioned model of the geologic environment, predict reflections using the background model, determine incoherence of an offset-dependent matching filter based at least in part on the reflections and the seismic data, based at least in part on the incoherence, adjust the background model to generate an adjusted background model, and output the adjusted background model. In such an example, the processor-executable instructions can include processor-executable instructions to instruct the system to perform a full waveform inversion based at least in part on the adjusted background model to output an earth model of the geologic environment. As an example, a system can receive seismic data that are acquired via sensors positioned in a geologic environment.

As an example, one or more computer-readable storage media can include computer-executable instructions to instruct a system to: receive seismic data of a geologic environment; receive a background model that is a part of a partitioned model of the geologic environment; predict reflections using the background model; determine incoherence of an offset-dependent matching filter based at least in part on the reflections and the seismic data; based at least in part on the incoherence, adjust the background model to generate an adjusted background model; and output the adjusted background model. In such an example, computer-executable instructions can be included to instruct a system to perform a full waveform inversion based at least in part on the adjusted background model to output an earth model of the geologic environment. As an example, seismic data can include seismic data acquired via sensors positioned in the geologic environment.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 12:
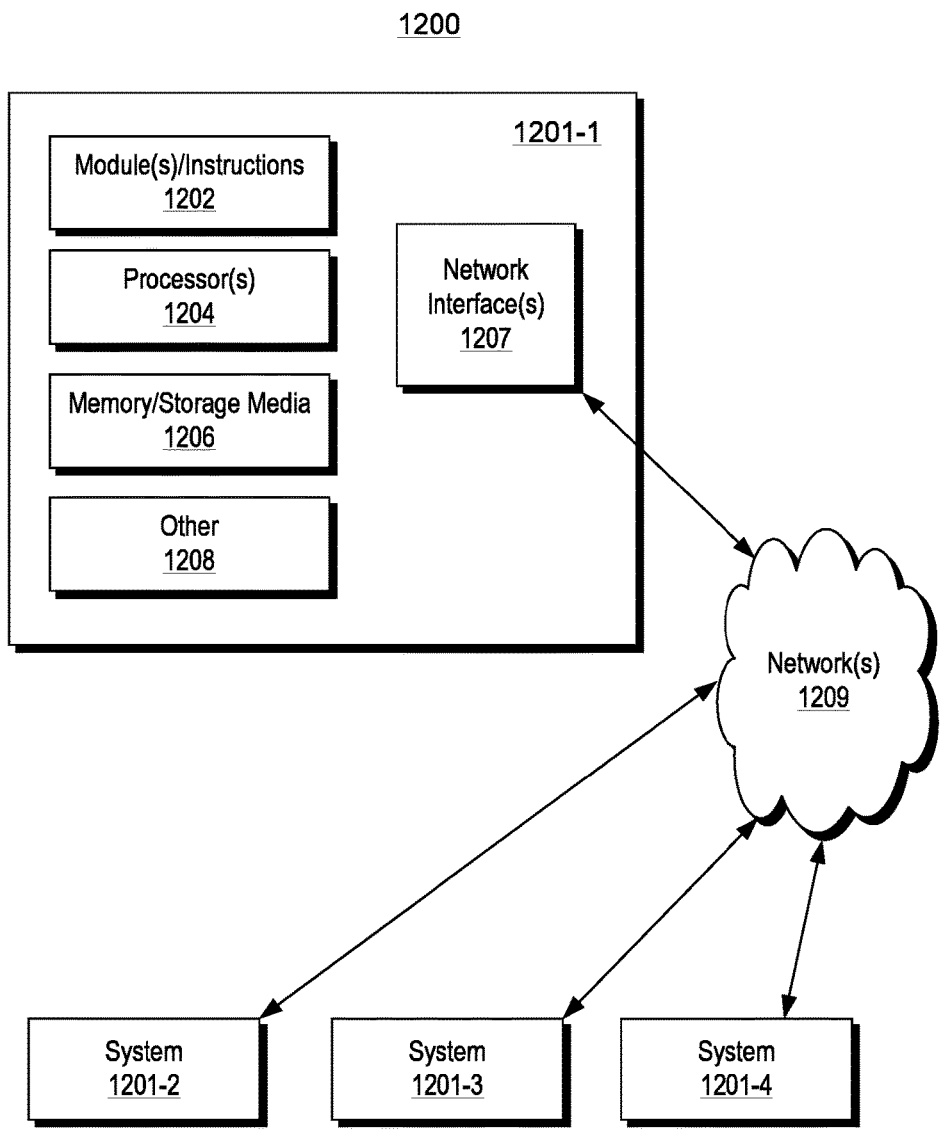
FIG. 12 illustrates an example of a computational environment and examples of equipment.

In some embodiments, a method or methods may be executed by a computing system. FIG. 12 shows an example of a system 1200 that can include one or more computing systems 1201-1, 1201-2, 1201-3 and 1201-4, which may be operatively coupled via one or more networks 1209, which may include wired and/or wireless networks.

As an example, a system can include an individual computer system or an arrangement of distributed computer systems. In the example of FIG. 12, the computer system 1201-1 can include one or more modules 1202, which may be or include processor-executable instructions, for example, executable to perform various tasks (e.g., receiving information, requesting information, processing information, simulation, outputting information, etc.).

As an example, a module may be executed independently, or in coordination with, one or more processors 1204, which is (or are) operatively coupled to one or more memory that can be storage media 1206 (e.g., via wire, wirelessly, etc.). As an example, one or more of the one or more processors 1204 can be operatively coupled to at least one of one or more network interface 1207. In such an example, the computer system 1201-1 can transmit and/or receive information, for example, via the one or more networks 1209 (e.g., consider one or more of the Internet, a private network, a cellular network, a satellite network, etc.).

As an example, the computer system 1201-1 may receive from and/or transmit information to one or more other devices, which may be or include, for example, one or more of the computer systems 1201-2, etc. A device may be located in a physical location that differs from that of the computer system 1201-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1206 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 13:
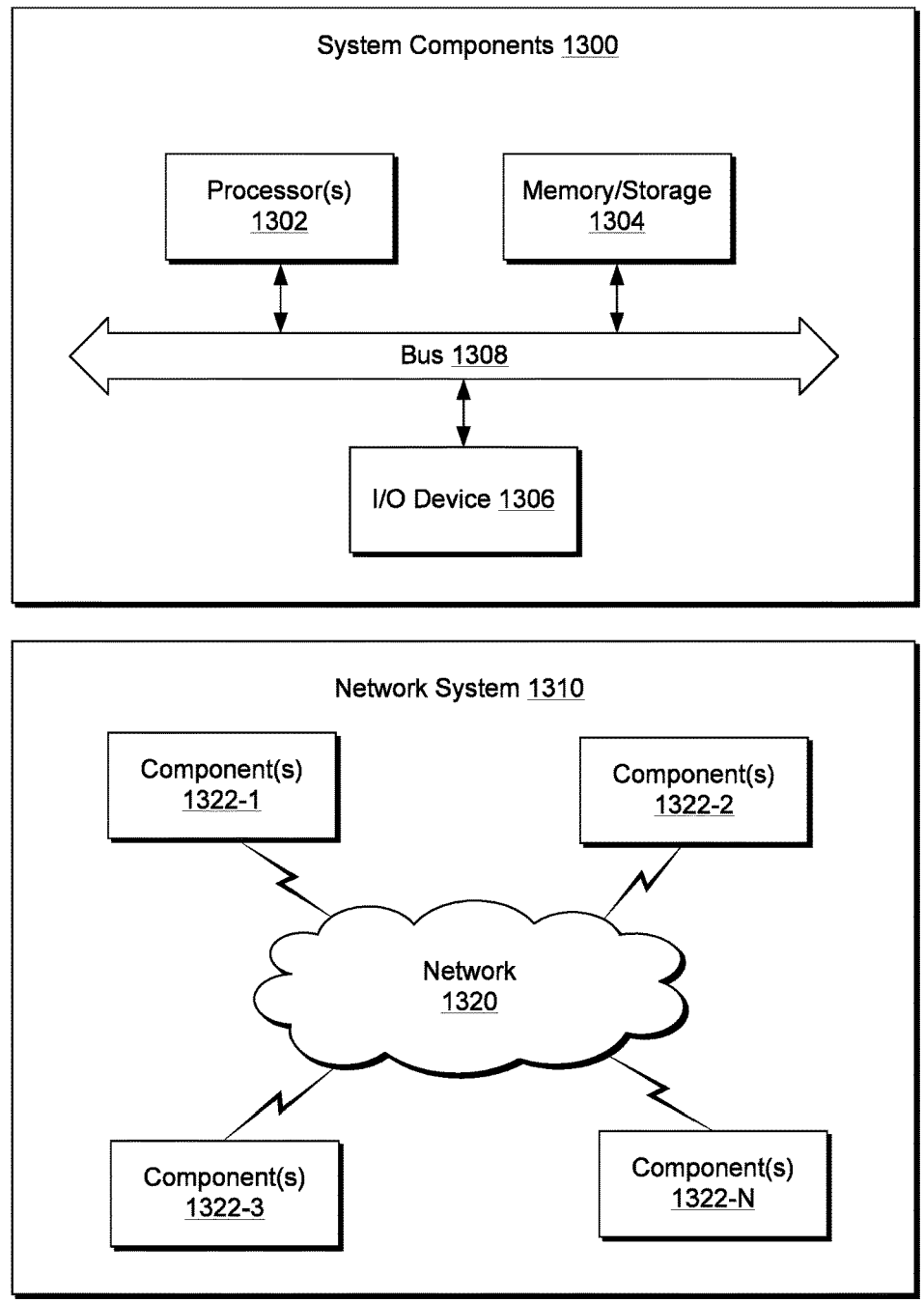
FIG. 13 illustrates example components of a system and a networked system.

FIG. 13 shows components of a computing system 1300 and a networked system 1310. The system 1300 includes one or more processors 1302, memory and/or storage components 1304, one or more input and/or output devices 1306 and a bus 1308. According to an embodiment, instructions may be stored in one or more computer-readable media (e.g., memory/storage components 1304). Such instructions may be read by one or more processors (e.g., the processor(s) 1302) via a communication bus (e.g., the bus 1308), which may be wired or wireless. The one or more processors may execute such instructions to implement (wholly or in part) one or more attributes (e.g., as part of a method). A user may view output from and interact with a process via an I/O device (e.g., the device 1306). According to an embodiment, a computer-readable medium may be a storage component such as a physical memory storage device, for example, a chip, a chip on a package, a memory card, etc.

According to an embodiment, components may be distributed, such as in the network system 1310. The network system 1310 includes components 1322-1, 1322-2, 1322-3, . . . 1322-N. For example, the components 1322-1 may include the processor(s) 1302 while the component(s) 1322-3 may include memory accessible by the processor(s) 1302. Further, the component(s) 1302-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
receiving seismic data of a geologic environment;
receiving a background model that is a part of a partitioned model of the geologic environment;
predicting reflections using the background model;
performing data domain extension to determine incoherence of the reflections and the seismic data based at least in part on an offset-dependent matching filter;
based at least in part on the incoherence, adjusting the background model to generate an adjusted background model; and
outputting the adjusted background model, wherein outputting the adjusted background model comprises generating a seismic image comprising the adjusted background model.

2. The method of claim 1 comprising performing a full waveform inversion based at least in part on the adjusted background model to output an earth model of the geologic environment.

3. The method of claim 1 wherein the partitioned model comprises the background model and a reflectivity model.

4. The method of claim 3 wherein the background model corresponds to a low-wavenumber component model and wherein the reflectivity model corresponds to a high-wavenumber component model.

5. The method of claim 3 wherein the background model comprises a smooth background model and wherein reflectivity model comprises a rough reflectivity model.

6. The method of claim 1 wherein the predicting reflections comprises Born modeling.

7. The method of claim 1 wherein the predicting reflections comprises applying a Born operator to the background model.

8. The method of claim 1 wherein the seismic data comprise seismic data acquired via sensors positioned in the geologic environment.

9. The method of claim 1 comprising partitioning a model of the geologic environment to form the background model and a reflectivity model.

10. The method of claim 1 wherein adjusting the background model to generate an adjusted background model comprises reducing the incoherence.

11. The method of claim 1 wherein determining incoherence comprises determining the incoherence along offset and time.

12. The method of claim 1 comprising determining the offset-dependent matching filter via a least-squares filter estimation formulation and a Toeplitz solver.

13. The method of claim 1 wherein adjusting the background model to generate an adjusted background model comprises determining a gradient of an objective function with respect to the background model.

14. The method of claim 13 wherein an adjoint operator carries information as to an appropriate adjustment direction for adjusting the background model.

15. The method of claim 13 wherein determining the gradient comprises determining source wavefields and receiver wavefields via forward and backward propagations and cross-correlating the source wavefields and the receiver wavefields in time.

16. The method of claim 1 wherein the adjusted background model is configured to be used to assist with exploration of the geologic environment.

17. The method of claim 1 wherein the adjusted background model is configured to be output while drilling through the geologic environment to reduce uncertainty in time-depth correlation without having to stop drilling.

18. The method of claim 1 wherein the adjusted background model is configured to be used to look ahead of a drill bit that is drilling through the geologic environment.

19. The method of claim 1 wherein the adjusted background model is configured to be used to guide a drill string to a target depth in the geologic environment.

20. A system comprising:
a processor;
memory accessible by the processor; and
processor-executable instructions stored in the memory that comprise processor-executable instructions to instruct the system to:
receive seismic data of a geologic environment,
receive a background model that is a part of a partitioned model of the geologic environment,
predict reflections using the background model,
perform data domain extension to determine incoherence of the reflections and the seismic data based at least in part on an offset-dependent matching filter,
based at least in part on the incoherence, adjust the background model to generate an adjusted background model, and
output the adjusted background model, wherein outputting the adjusted background model comprises generating a seismic image comprising the adjusted background model.

21. The system of claim 20 wherein the processor-executable instructions comprise processor-executable instructions to instruct the system to perform a full waveform inversion based at least in part on the adjusted background model to output an earth model of the geologic environment.

22. The system of claim 20 wherein the seismic data comprise seismic data acquired via sensors positioned in the geologic environment.

23. One or more non-transitory computer-readable storage media comprising computer-executable instructions to instruct a system to:
receive seismic data of a geologic environment;
receive a background model that is a part of a partitioned model of the geologic environment;
predict reflections using the background model;
perform data domain extension to determine incoherence of the reflections and the seismic data based at least in part on an offset-dependent matching filter;
based at least in part on the incoherence, adjust the background model to generate an adjusted background model; and
output the adjusted background model, wherein outputting the adjusted background model comprises generating a seismic image comprising the adjusted background model.

24. The one or more non-transitory computer-readable storage media of claim 23 wherein the computer-executable instructions comprise computer-executable instructions to instruct a system to perform a full waveform inversion based at least in part on the adjusted background model to output an earth model of the geologic environment.

25. The one or more non-transitory computer-readable storage media of claim 23 wherein the seismic data comprise seismic data acquired via sensors positioned in the geologic environment..

* * * * *